(12) United States Patent
Nguyen et al.

(10) Patent No.: US 11,643,920 B2
(45) Date of Patent: *May 9, 2023

(54) DIP CORRECTION FOR NON-CIRCULAR BOREHOLE AND OFF-CENTER LOGGING

(71) Applicant: Halliburton Energy Services, Inc., Houston, TX (US)

(72) Inventors: Nam Nguyen, Singapore (SG); David Orlando Torres, Bastrop, TX (US); Gary Wayne Kainer, Tomball, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/649,324

(22) Filed: Jan. 28, 2022

(65) Prior Publication Data

US 2022/0154572 A1 May 19, 2022

Related U.S. Application Data

(63) Continuation of application No. 16/495,096, filed as application No. PCT/US2018/066009 on Dec. 17, 2018, now Pat. No. 11,248,457.

(51) Int. Cl.
*E21B 47/002* (2012.01)
*E21B 47/125* (2012.01)
(Continued)

(52) U.S. Cl.
CPC ........ *E21B 47/0025* (2020.05); *E21B 47/026* (2013.01); *E21B 47/125* (2020.05); *G01V 3/20* (2013.01)

(58) Field of Classification Search
CPC .. E21B 47/0025; E21B 47/125; E21B 47/026; G01V 3/20
(Continued)

(56) References Cited

U.S. PATENT DOCUMENTS

| 4,455,529 A | 6/1984 | Sinclair |
| 5,041,975 A * | 8/1991 | Minerbo ................. G01V 3/38 |
| | | 702/7 |

(Continued)

OTHER PUBLICATIONS

PCT Application No. PCT/US2018/066009, International Search Report, dated Aug. 26, 2019, 3 pages.
(Continued)

*Primary Examiner* — Kerri L McNally
(74) *Attorney, Agent, or Firm* — Delizio, Peacock, Lewin & Guerra

(57) ABSTRACT

A method includes deploying a logging tool in a borehole formed in a subsurface formation, the logging tool having a transmitter and a receiver, wherein a condition that is present during logging comprises at least one of a shape of the borehole is non-circular and the logging tool is off-center within the borehole. The method includes emitting, by the transmitter, a signal into subsurface formation and detecting, by the receiver, a response to the signal being propagated through the subsurface formation. The method includes creating, from the response, a borehole image that includes features in the subsurface formation and correcting the features, wherein correcting the features comprises mapping points of a non-circular shape in the borehole image into a plane substantially perpendicular to an axis of the borehole.

20 Claims, 17 Drawing Sheets

(51) Int. Cl.
*E21B 47/026* (2006.01)
*G01V 3/20* (2006.01)

(58) Field of Classification Search
USPC .......................................................... 702/27
See application file for complete search history.

(56) References Cited

U.S. PATENT DOCUMENTS

| | | | |
|---|---|---|---|
| 11,248,457 B2* | 2/2022 | Nguyen | .................. E21B 47/12 |
| 2006/0031017 A1* | 2/2006 | Mathieu | .................. G01V 3/20 |
| | | | 702/6 |
| 2007/0024286 A1 | 2/2007 | Wang | |
| 2013/0073206 A1* | 3/2013 | Hou | ........................ F15B 15/14 |
| | | | 702/6 |
| 2013/0176139 A1* | 7/2013 | Chau | ........................ G01V 3/30 |
| | | | 340/854.4 |
| 2015/0039231 A1* | 2/2015 | Celepcikay | .............. G01V 1/48 |
| | | | 702/7 |
| 2018/0239047 A1* | 8/2018 | Hou | ........................ G01V 3/38 |
| 2021/0332692 A1 | 10/2021 | Nguyen et al. | |

OTHER PUBLICATIONS

PCT Application No. PCT/US2018/066009, International Written Opinion, dated Aug. 26, 2019, 6 pages.

Liu, et al., "Improved Borehole Image Dip Calculation in Irregulady Shaped and Curved Boreholes in High Angle and Horizontal Wells", SPWLA 51st Annual Logging Symposium, Jun. 19-23, 2010, 7 pages.

* cited by examiner

US 11,643,920 B2

DIP CORRECTION FOR NON-CIRCULAR BOREHOLE AND OFF-CENTER LOGGING

TECHNICAL FIELD

The disclosure generally relates to the field of subsurface formation evaluation, and more particularly to formation dip correction for non-circular boreholes and off-center logging tools.

BACKGROUND

Accurate characterization of structural and stratigraphic bedding features of subsurface formations allows for increased hydrocarbon recovery from such formations. This characterization includes measuring the magnitude and direction of the formation dip.

BRIEF DESCRIPTION OF THE DRAWINGS

Embodiments of the disclosure may be better understood by referencing the accompanying drawings.

DESCRIPTION OF EMBODIMENTS

The description that follows includes example systems, methods, techniques, and program flows that embody embodiments of the disclosure. However, it is understood that this disclosure may be practiced without these specific details. For instance, this disclosure refers to dip correction based on changing a shape of a borehole from elliptical to circular in illustrative examples. Embodiments of this disclosure can be also applied to any other non-circular borehole shape. In other instances, well-known instruction instances, protocols, structures and techniques have not been shown in detail in order not to obfuscate the description.

Downhole logging tool (such as a resistivity imaging tool) may be used to determine the resistivity of the borehole layers. These tools can be used to perform formation evaluation. Such formation evaluation can include identification a wide range of characteristics from the magnitude and direction of the formation dip, thinly laminated beds, lithology, porosity, fluid profile, flow potential, and presence of permeability barriers, sand attributes, clasts, vugs, etc. For example, these downhole logging tools can capture borehole images that can then be used to perform the formation evaluation.

In an ideal borehole condition with the logging tool centralized, these dipping formation beds appear as non-distorted sine waves when viewed on an image log. However, in non-ideal borehole conditions these sinusoidal features can become distorted which create problems in detecting and characterizing formation dips. Various embodiments provide for correction of the borehole images to remove distortion of formation dips caused by either a non-circular borehole shape or a logging tool that is off-center in the borehole. Various embodiments include detection and processing of images of subsurface formations to provide for accurate characterization of structural and stratigraphic bedding features of these formations. This characterization can include measuring the magnitude and direction of the formation dip. Once the images are corrected, the formation dips can be identified and fitted. Additionally, the results of interpolation using the formation dips can be enhanced.

Example Systems

Figure 1:
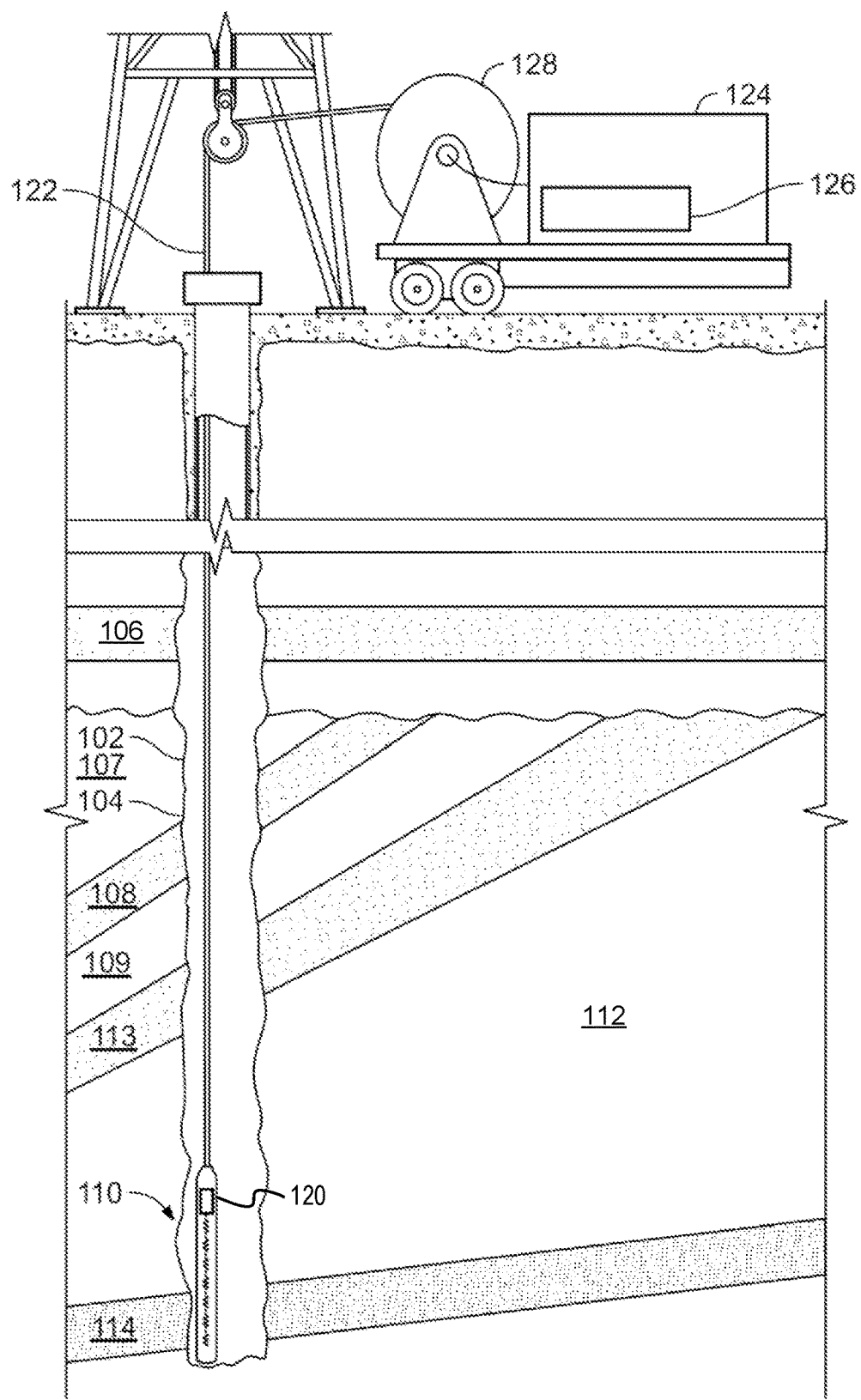
FIG. 1 depicts an example wireline system, according to some embodiments.
Figure 2:
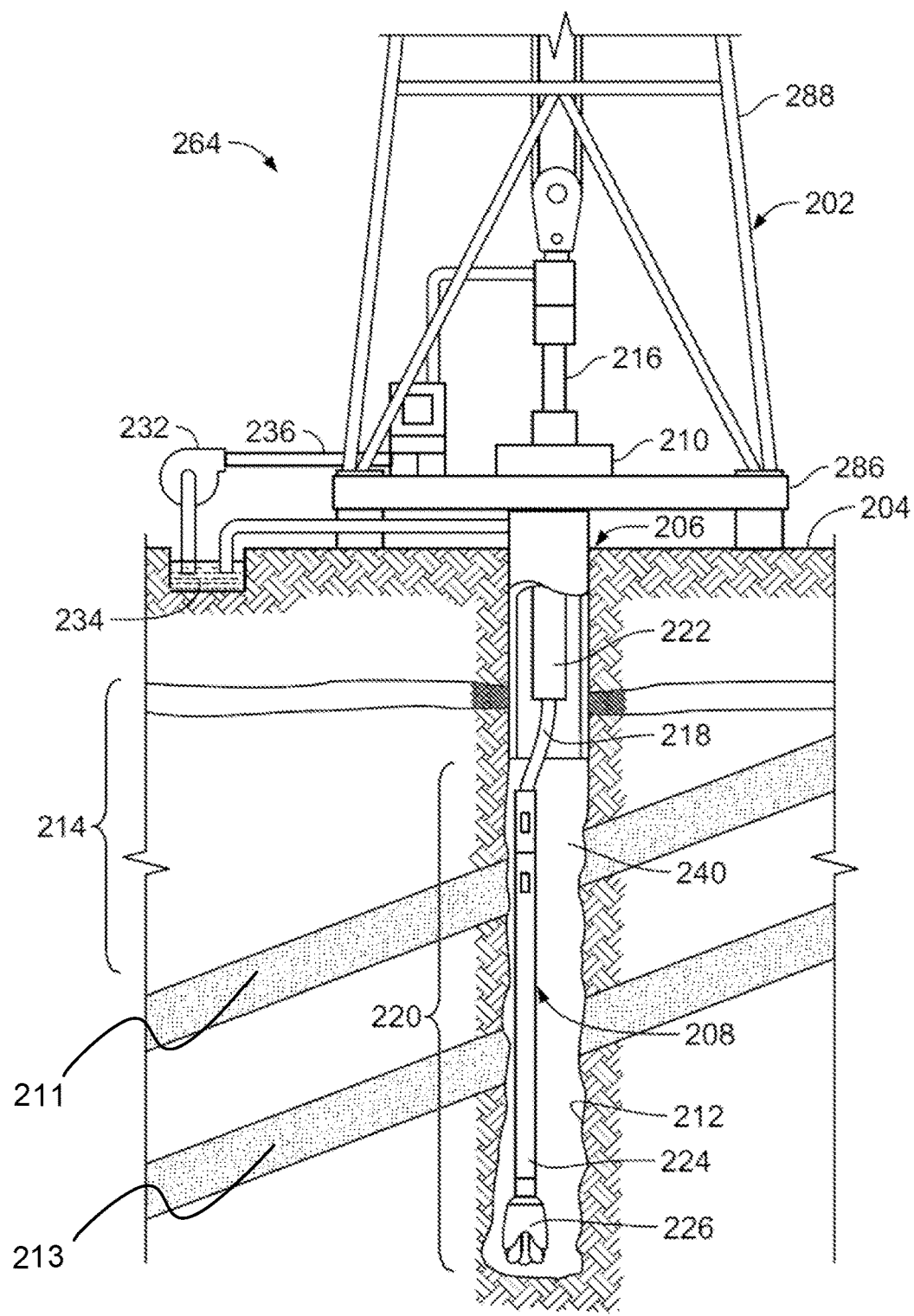
FIG. 2 depicts an example drilling system, according to some embodiments.

FIGS. 1-2 depict an example wireline system and a drilling system, respectively. In these examples, the boreholes are non-circular, and the logging tools are not centered in the borehole during logging. Either condition can result in distortion of formation dips of borehole images captured during logging. Various embodiments (described below) provide for removal of this distortion of the captured borehole images that is caused by at least one of the borehole being non-circular and the logging tool not being centered during logging.

FIG. 1 depicts an example wireline system, according to some embodiments. In particular, FIG. 1 depicts an example wireline system that includes a logging tool 110 disposed in a wellbore 102 drilled through earth formations. In some embodiments, the logging tool 110 can be an induction well logging tool. The earth formations are shown generally at 106, 107, 108, 109, 112, 113 and 114. The logging tool 110 is typically lowered into the wellbore 102 at one end of a conveyance 122 by means of a winch 128 or similar device. The conveyance 122 may be one or more of a slickline, wireline, coiled tubing, pipe, etc. Conveyance 122 may at times provide power, telemetry, or both power and telemetry. The logging tool 110 can include a signal processor device 120 (device 120). The device 120 can include a source of alternating current (not shown separately). The alternating current is generally conducted through a transmitter 116 disposed on the logging tool 110. Receivers 118A-118F can be disposed at axially spaced apart locations along the logging tool 110. The device 120 can include receiver circuits (not shown separately) connected to the receivers 118A-118F for detecting voltages induced in each of the receivers 118A-118F. The device 120 can also impart signals to the cable 122 corresponding to the magnitude of the voltages induced in each of the receivers 118A-118F. It is to be understood that there can be a different number of transmitters and receivers and different relative geometries of the transmitter 116 and the receivers 118A-118F than those shown in FIG. 1.

The alternating current passing through the transmitter 116 induces eddy currents in the earth formations 106, 107, 108, 109, 112, 113, 114. The eddy currents correspond in magnitude both to the electrical conductivity of the earth formations 106, 107, 108, 109, 112, 113, 114 and to the relative position of the particular earth formation with respect to the transmitter 116. The eddy currents in turn induce voltages in the receivers 118A-118F, the magnitude of which depends on both the eddy current magnitude and the relative position of the earth formation with respect to the individual receiver 118A-118F.

The signals, corresponding to the voltages induced in each receiver 118A-118F, can be transmitted along the cable 122 to a computer 124. The computer 124 can include detectors (not shown separately) for interpreting the signals transmitted from the logging tool 110. The computer 124 can also include a processor 126 to perform the process the signals (as further described below). In some embodiments, some or all of the processing of the signals can be performed by the device 120 downhole.

The voltages induced in each receiver 118A-118F correspond to apparent electrical conductivity of the media surrounding the logging tool 110. The media comprise the earth formations 106, 107, 108, 109, 112, 113, 114 and the drilling mud 104 in the wellbore 102. The degree of correspondence between the voltages induced in a particular receiver, and the electrical conductivity of the particular earth formation axially disposed between the particular receiver and the transmitter 116, can depend on the relative inclination of the layers of the earth formations, such as formation 112, and the axis of the logging tool 110.

In some embodiments, the imaging can be captured by a Measurement While Drilling (MWD) or Logging While Drilling (LWD) logging tool as part of a drilling system. An example of such a drilling system is now described. FIG. 2 depicts an example drilling rig system, according to some embodiments.

In FIG. 2 it can be seen how a system 264 can include a drilling rig 202 located at the surface 204 of a well 206. Drilling of oil and gas wells is commonly carried out using a string of drill pipes connected together so as to form a drilling string 208 that is lowered through a rotary table 210 into a wellbore or borehole 112. Here a drilling platform 286 is equipped with the derrick 202 that supports a hoist.

The drilling rig 202 may thus provide support for the drill string 208. The drill string 208 may operate to penetrate the rotary table 210 for drilling the borehole 112 through subsurface formations 211, 213, 214. Subsurface formations can include layers of differing resistivities. The drill string 208 may include a Kelly 216, drill pipe 218, and a bottom hole assembly 220, perhaps located at the lower portion of the drill pipe 218.

The bottom hole assembly 220 may include drill collars 222, a down hole tool 224, and a drill bit 226. The drill bit 226 may operate to create the borehole 112 by penetrating the surface 204 and subsurface formations 211, 213, 214. The down hole tool 224 may comprise any of a number of different types of tools including MWD tools, LWD tools, and others. In some embodiments, the down hole tool 224 includes an NMR logging tool (as described herein).

During drilling operations, the drill string 208 (perhaps including the Kelly 216, the drill pipe 218, and the bottom hole assembly 220) may be rotated by the rotary table 210. In addition to, or alternatively, the bottom hole assembly 220 may also be rotated by a motor (e.g., a mud motor) that is located down hole. The drill collars 222 may be used to add weight to the drill bit 226. The drill collars 222 may also operate to stiffen the bottom hole assembly 220, allowing the bottom hole assembly 220 to transfer the added weight to the drill bit 226, and in turn, to assist the drill bit 226 in penetrating the surface 204 and subsurface formations 211, 213, 214.

During drilling operations, a mud pump 232 may pump drilling fluid (sometimes known by those of ordinary skill in the art as "drilling mud") from a mud pit 234 through a hose 236 into the drill pipe 218 and down to the drill bit 226. The drilling fluid can flow out from the drill bit 226 and be returned to the surface 204 through an annular area 240 between the drill pipe 218 and the sides of the borehole 112. The drilling fluid may then be returned to the mud pit 234, where such fluid is filtered. In some embodiments, the drilling fluid can be used to cool the drill bit 226, as well as to provide lubrication for the drill bit 226 during drilling operations. Additionally, the drilling fluid may be used to remove subsurface formation 211, 213, 214 cuttings created by operating the drill bit 226. It is the images of these cuttings that many embodiments operate to acquire and process.

The eddy currents induced by the transmitter coils tend to flow in circular paths that are coaxial with the transmitter coils. For a vertical borehole traversing horizontal formations, each line of current flow ideally remains in the same formation along its entire flow path, and never crosses a bed boundary. Thus, one simplifying assumption that is made in relating the receiver voltage measurements to the conductivity of the earth formations is that the ground loops are positioned entirely within a portion of the earth formation having substantially circumferentially uniform conductivity. This assumption fails in cases where layers of the earth formations are not perpendicular to, but are inclined with respect to, the axis of the wellbore (and consequently the axis of the instrument). A boundary separates two layers which can have different conductivities. When the ground loops cross one or more bed boundaries, errors are introduced into the tool response. This is known as the "dipping effect."

The dipping effect is classified into two components: the charge component and the volumetric component. The charge component is caused by an electric charge buildup when the induced eddy currents flow across inclined formation interfaces. Quantitatively, the charge component depends on the inner product of the electric field vector and the directional derivative of the formation conductivity. The volumetric component is caused by the fact that eddy currents take paths through formations of different conductivities.

Another tool error is commonly known as the "nonlinear shoulder effect." As the logging tool traverses the wellbore it commonly approaches, crosses, and then passes bed boundaries between formation layers. While the logging tool is proximate these bed boundaries, a portion of the receiver response comes from the bed or beds adjacent the bed in which the logging tool lies, introducing error into the measurements. It has been established that a portion of this tool response error in the regions proximate bed boundaries is non-linear. This nonlinearity makes it difficult to evaluate exactly the response portion that is from the adjacent bed, leading to an incorrect evaluation of the conductivity of the bed of interest.

Thus, a logging tool at an angle to a formation bed produces a series of inaccurate measurements. The larger the dip angle, the less accurate is the measurement with depth. Further, the log includes polarization "horns", which correspond to the charge effect.

The measurements from logging tools can be used to create formation resistivity well logs. Formation resistivity well logs are commonly used to map subsurface geologic structures and to infer the fluid content within pore spaces of earth formations. Formation resistivity well logs include electromagnetic induction logs. Of course, if not corrected for, the dipping error and shoulder bed error made in the raw measurements are reflected by inaccuracies in the formation resistivity well logs. The borehole shape may be elliptical thereby distorting the sinusoidal nature of the unrolled bed boundary borehole image. To correct for this distortion, the borehole shape may be transformed onto a unit circle through a linear transformation method.

Example Operations

Figure 3:
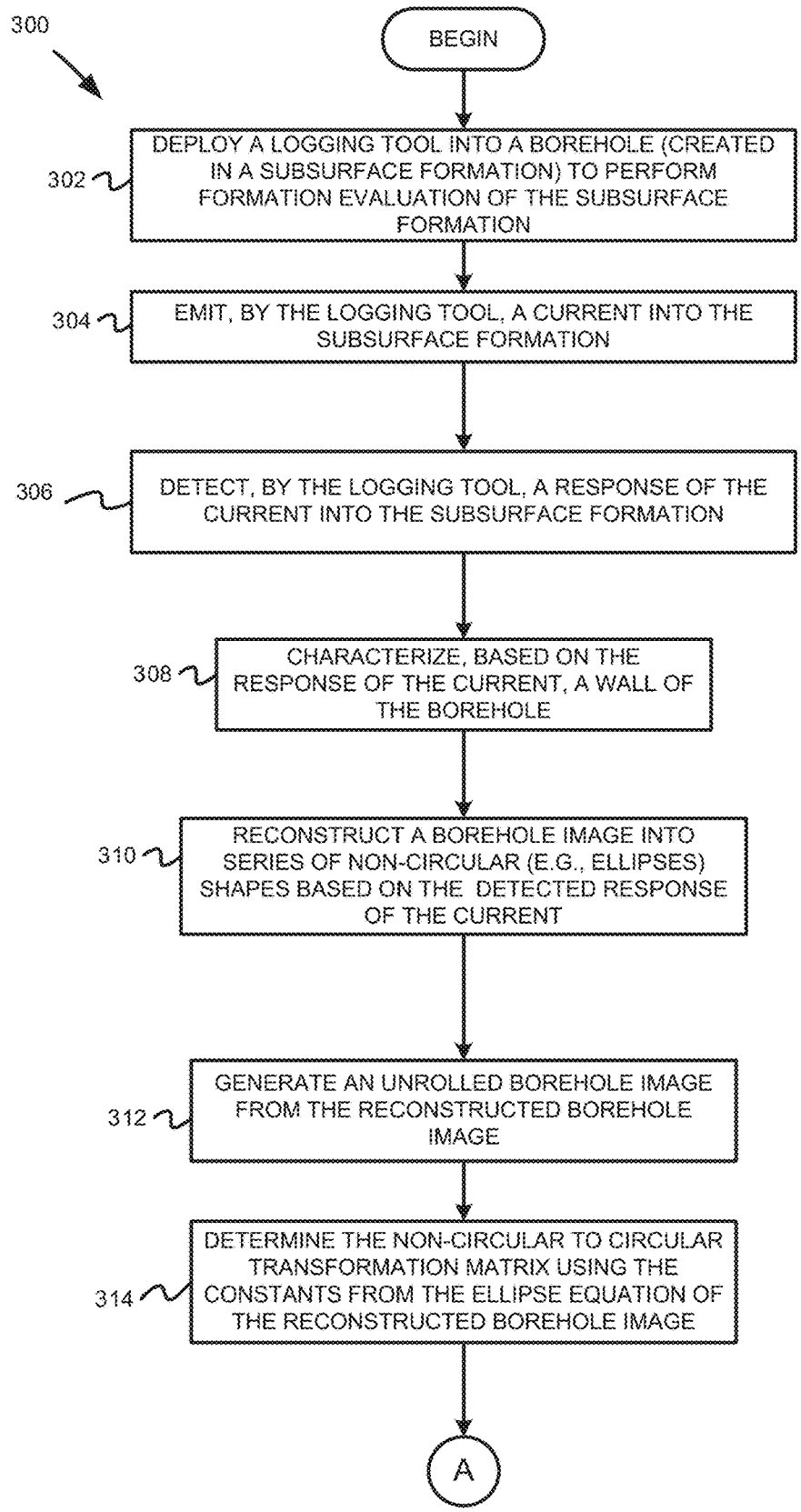
FIGS. 3-4 depict flowcharts of operations for dip correction for non-circular boreholes and off-center logging, according to some embodiments.
Figure 4:
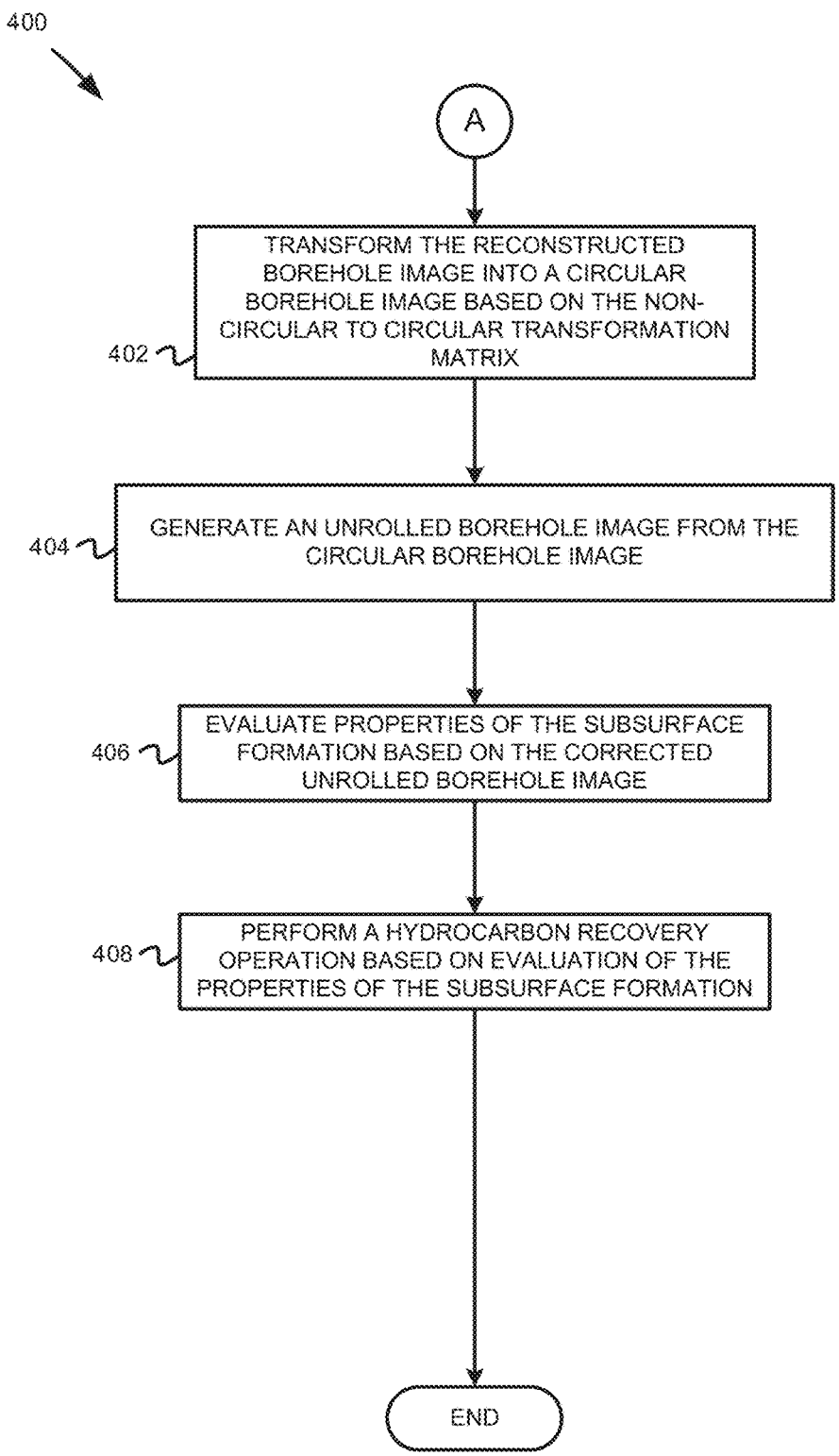

FIGS. 3-4 depict flowcharts of operations for dip correction for non-circular boreholes and off-center logging, according to some embodiments. Flowcharts 300 and 400 of FIGS. 3-4 include operations that can be performed by hardware, software, firmware, or a combination thereof. For example, at least some of the operations can be performed by a processor executing program code or instructions. In some embodiments, such operations can be performed downhole in a logging tool and/or in a computer at the surface. Operations depicted in the flowchart 300 continue to operations depicted in the flowchart 400 through transition point A.

At block 302, a logging tool is deployed in a borehole created in a subsurface formation. For example, with reference to FIGS. 1-2, the logging tool 110 is deployed in the borehole 112. The logging tool 110 can be any type of tool that captures imaging of the surrounding subsurface formation (e.g., the formations 106, 107, 108, 109, 112, 113 and 114) to characterize the borehole. For example, the logging tool 110 can be a micro-resistivity imaging tool such as Oil Mud Reservoir Imager Tool.

At block 304, a current is emitted, by the logging tool, into the subsurface formation. For example, with reference to FIGS. 1-2, one or more transmitters of the logging tool 110 can emit a current into the subsurface formations.

At block 306, a response to the current being emitted into the subsurface formation is detected. For example, with reference to FIGS. 1-2, one or more sensors of the logging tool 110 detects a response to the current being emitted into the subsurface formation. To illustrate, the logging tool 110 can include multiple caliper arms that are in two axes. Each caliper arms can be equipped with a pad containing resistivity sensors able to provide resistivity measurements circumferentially around the borehole wall 112 and provide the angle and distance between the center of the logging tool 110 and their points of contact with the wall of the borehole 112.

At block 308, a wall of the borehole 112 is characterized based on the response to the current. For example, the characteristic of the wall of the borehole 112 can be a combination of the angle and distance of the borehole from the center of the tool and their associated resistivity. For example, with reference to FIGS. 1-2, a processor downhole and/or at the surface can perform this operation where the response to a current obtained by the logging tool 110 can be interpreted to distinguish layers of the subsurface formation based on the resistivity and other properties of the subsurface formation. Based on different resistivity a graph depicting the stratified layers of the subsurface formation can be generated.

Figure 5:
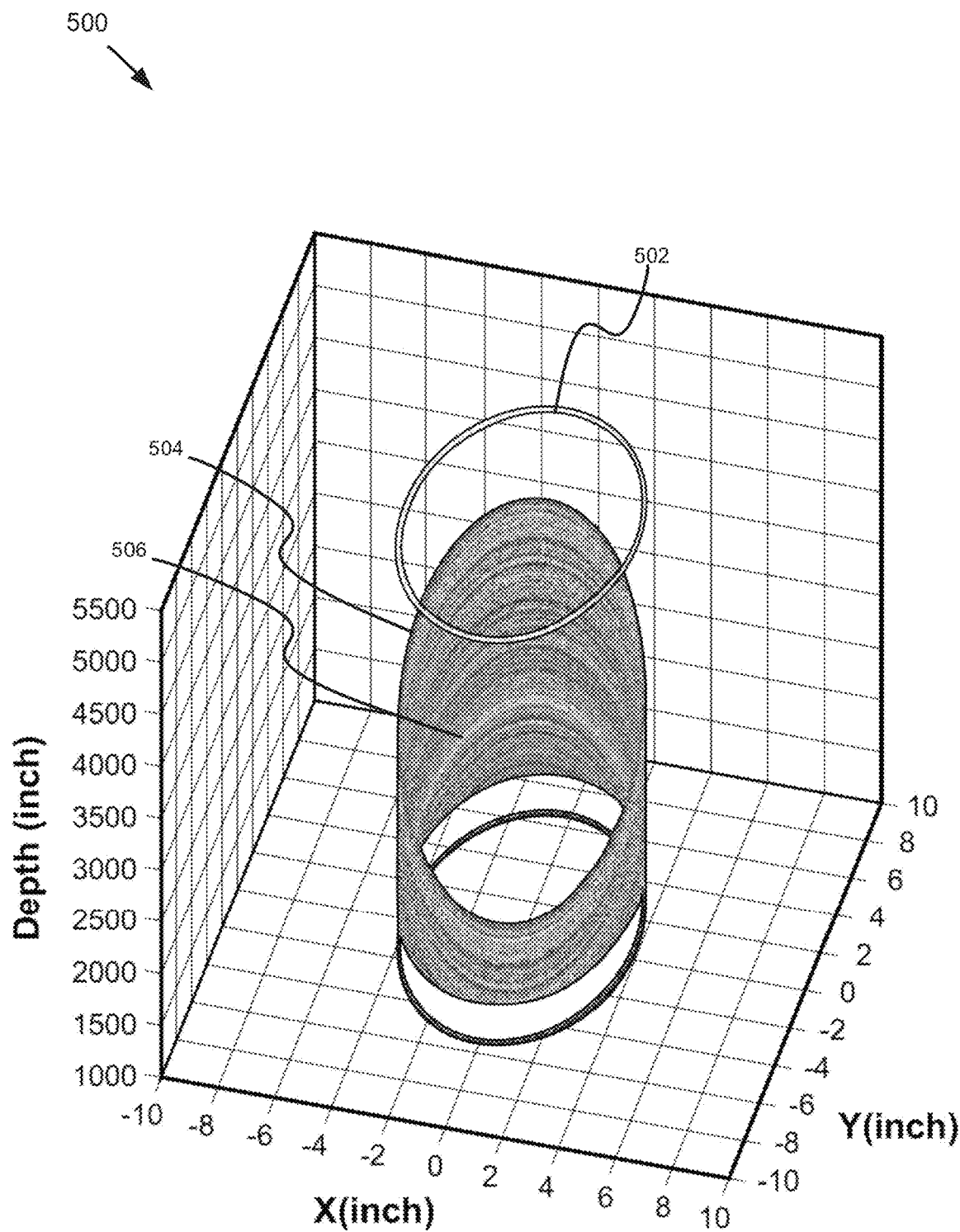
FIG. 5 depicts a graph of a borehole with slant layers, according to some embodiments.

To illustrate, FIG. 5 depicts a graph of a borehole with slant layers, according to some embodiments. In particular, FIG. 5 depicts a graph 500 that includes an x-axis, y-axis, and a z-axis as shown in inches. The Z-axis corresponds to the depth in the borehole. The graph 500 includes a number of ellipses 504 and 506. Each of the ellipses 504 and 506 represents a subsurface formation layer of differing resistivities. Thickness of ellipses 504 and 506 correspond to the thickness of the corresponding subsurface formation layer. For example, with reference to FIG. 1, the thickness of the ellipses 504 and 506 can correspond to the thickness of the formations 106, 107, 108, 109, 112, 113 and 114. A flat non-slanted ellipse 502 is added to the graph to help visualize by contrast that ellipses 504 and 506 traverse multiple depths when unrolled.

Figure 6:
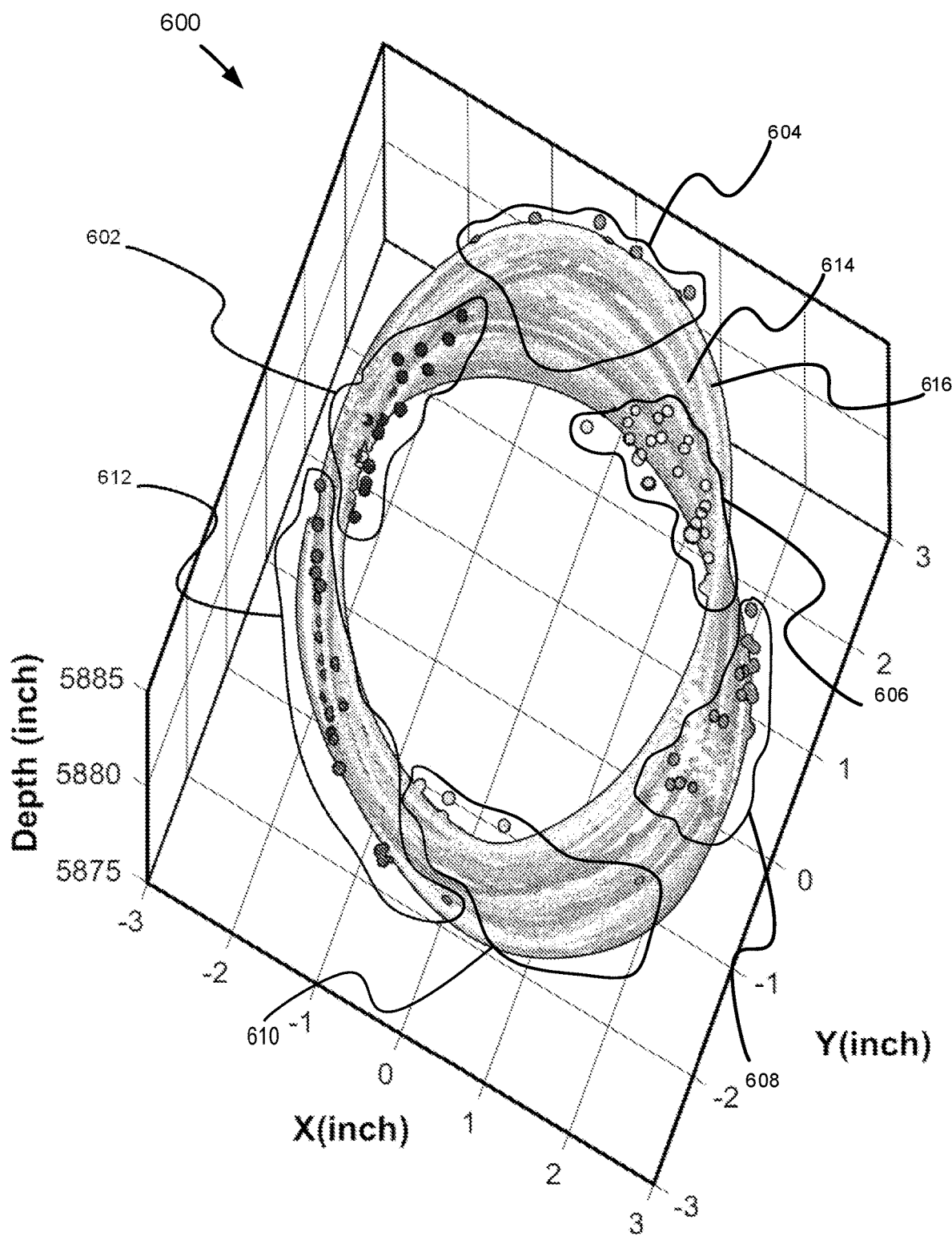
FIG. 6 depicts a graph of a reconstructed (elliptical) borehole from measurements obtained from the borehole, according to some embodiments.

At block 310, the wall of the borehole is reconstructed into a series of non-circular (e.g., ellipses) shapes based on the detected response to the logging tool such as the tool arms extending to contact the inner borehole surface and the current emitted into the subsurface formation. For example, with reference to FIGS. 1-2, a processor downhole and/or at the surface can perform this operation. As described above, the logging tool 110 can include multiple caliper arms that are in two axes. Each caliper arm can be equipped with a pad containing resistivity sensors that are used to provide the angle and distance between the center of the logging tool and their points of contact with the wall of the borehole 112. These points and their associated angle and distance from the center can be used to determine the x-y coordinates of the points of contacts between the borehole wall and the arms of the logging tool. To illustrate, FIG. 6 depicts a graph of a reconstructed (elliptical) borehole from measurements obtained from the borehole, according to some embodiments. FIG. 6 depicts a graph 600 that includes six groups of points of different shades 602, 604, 606, 608, 610, and 612 that represent contact points obtained by six different calipers of the logging tool 110. Graph 600 includes an x-axis, y-axis, and a z-axis as shown in inches.

The groups of caliper contact points 602, 604, 606, 608, 610, and 612 on the x-y axis are then used to reconstruct the borehole into series of non-circular shapes that correspond to various subsurface formation layers of different resistivities. In the graph 600, the non-circular shapes are ellipses 614, 616. In some embodiments, a best-fit function is applied over the points to reconstruct the borehole into a series of non-circular shapes. Alternatively, or in addition, the equation of the non-circular shape can be solved to reconstruct the borehole into a series of non-circular shapes.

The general equation for a conic section, including an ellipse, in a Cartesian coordinate system can be described by Equation (1) where x and y are the coordinate location of the point that are obtained from the logging tool 110, and $a_1 \ldots a_5$ are constants that define the nature of the conic section.

$$x^2 + a_1 y^2 + a_2 xy + a_3 x + a_4 y + a_5 = 0 \qquad (1)$$

Various points in the x-y axis are then used to solve for Equation (1). By using six points selected from each group of caliper contact points 602, 604, 606, 608, 610, and 612 in the same subterranean layer and their x and y coordinates derived from the logging tool, a series of ellipse equations, Equation (2), can be generated and the five constants $a_1 \ldots a_5$ as solved.

$$x_1^2 + a_1 y_1^2 + a_2 x_1 y_1 + a_3 x_1 + a_4 y_1 + a_5 = 0 \quad (2)$$
$$x_2^2 + a_1 y_2^2 + a_2 x_2 y_2 + a_3 x_2 + a_4 y_2 + a_5 = 0$$
$$\vdots$$
$$x_6^2 + a_1 y_6^2 + a_2 x_6 y_6 + a_3 x_6 + a_4 y_6 + a_5 = 0$$

The constants $a_1 \ldots a_5$ as solved by Equation (2) identifies the ellipse equation that corresponds to contact points selected from the same subterranean layer. Series of ellipse equations that are associated with each subterranean layer can be obtained during this step. In other instances where the points do not lie evenly in an ellipse, the ellipses 614, 616 and their corresponding ellipse equations can be obtained by applying a best fit function over various contact points in each subterranean layer. The differing shades of ellipse 614, 616 represents the differing resistivities of subterranean layers.

Figure 7:
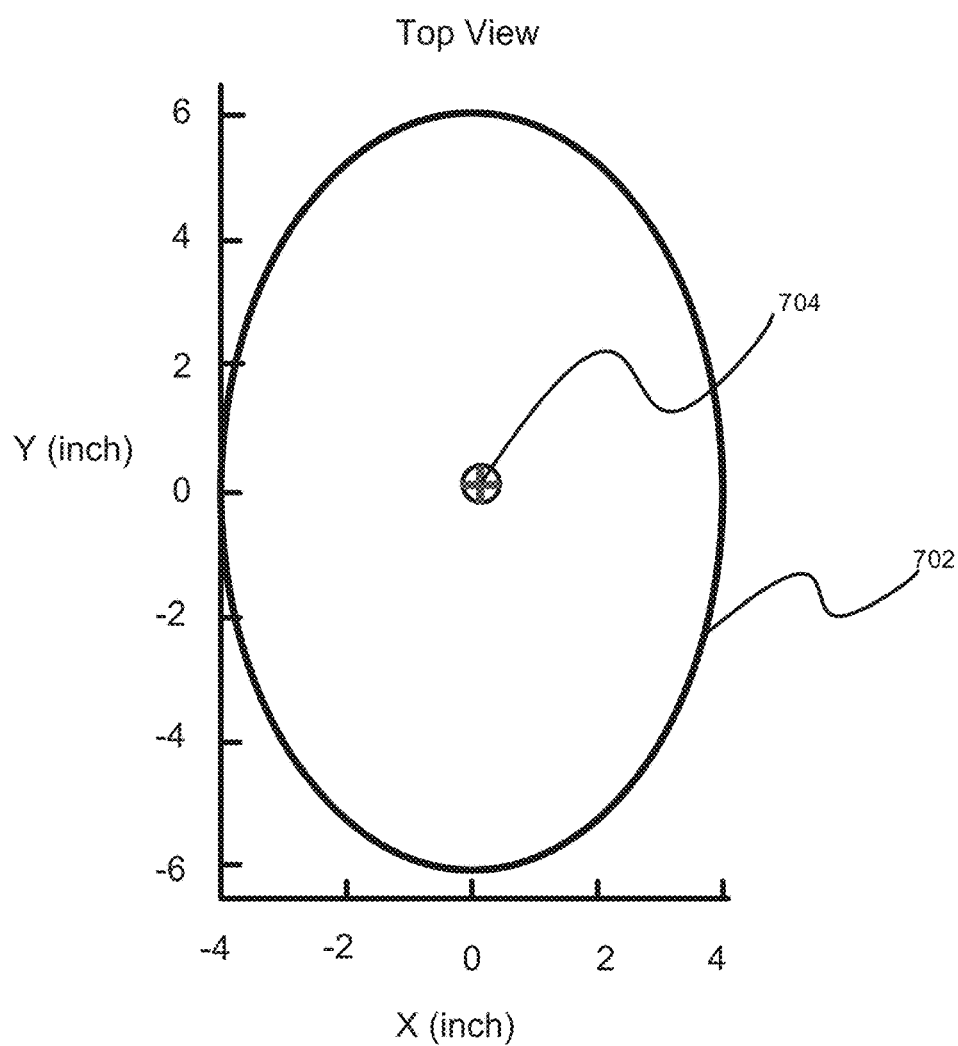
FIG. 7 depicts a graph of a top view of non-circular borehole, according to some embodiments.

FIG. 7 depicts a graph of a top view of non-circular borehole, according to some embodiments.

In particular, FIG. 7 depicts a graph 700 that lies in the x-y plane. An ellipse 702 includes a position 704 of the logging tool 110 at the same position as the center of the borehole. As shown, the borehole image is non-circular (elliptical) even when the logging tool 110 is centered in the borehole. In some examples, the borehole image captured is non-circular because the borehole itself is non-circular. Before the transformation, the x-axis and the y-axis has the corresponding units (inches).

Figure 8:
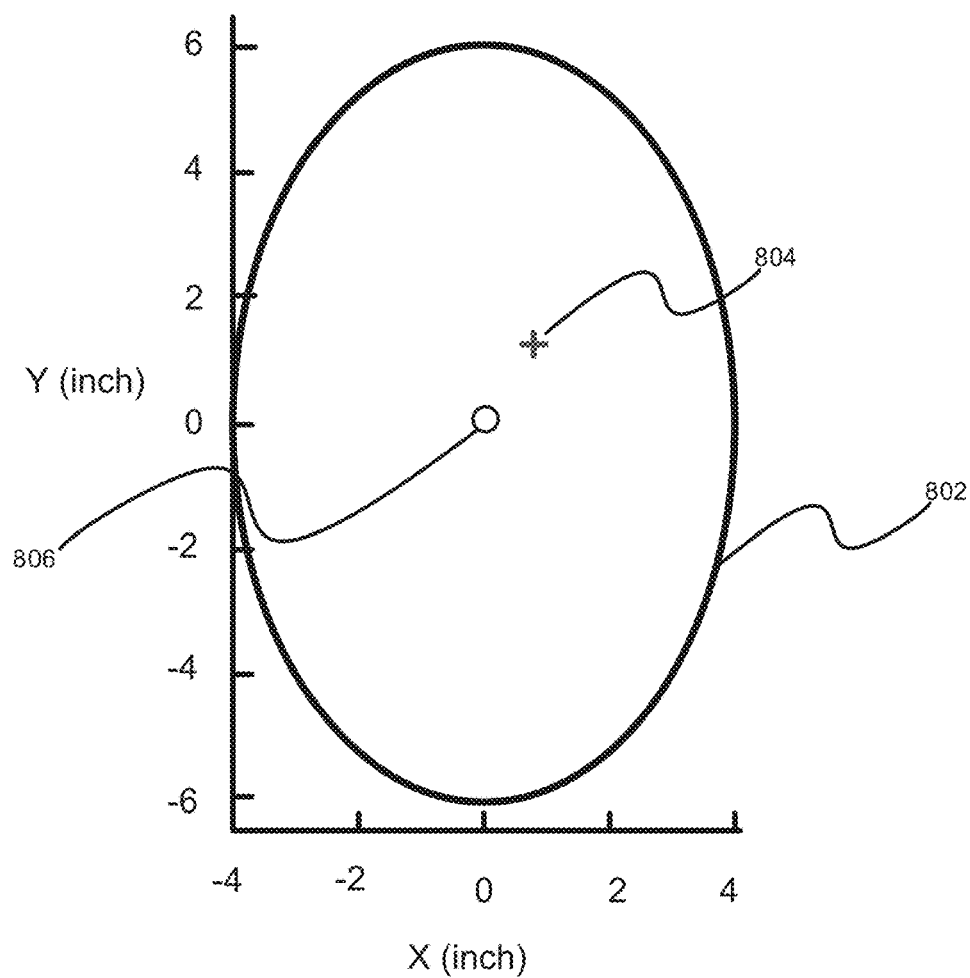
FIG. 8 depicts a graph of a top view of non-circular borehole with the logging tool off-center, according to some embodiments.

Other embodiments may include non-circular reconstruction of the wall of the borehole 112 where the logging tool is off center. To illustrate, FIG. 8 depicts a graph of a top view of non-circular borehole with the logging tool off-center, according to some embodiments. In particular, FIG. 8 depicts a graph 800 that lies in the x-y plane. An ellipse 802 includes a position 804 of the logging tool 110 that is at a different position from a center of the borehole 806. In some examples, the borehole image captured is non-circular because the borehole itself is non-circular.

Figure 9:
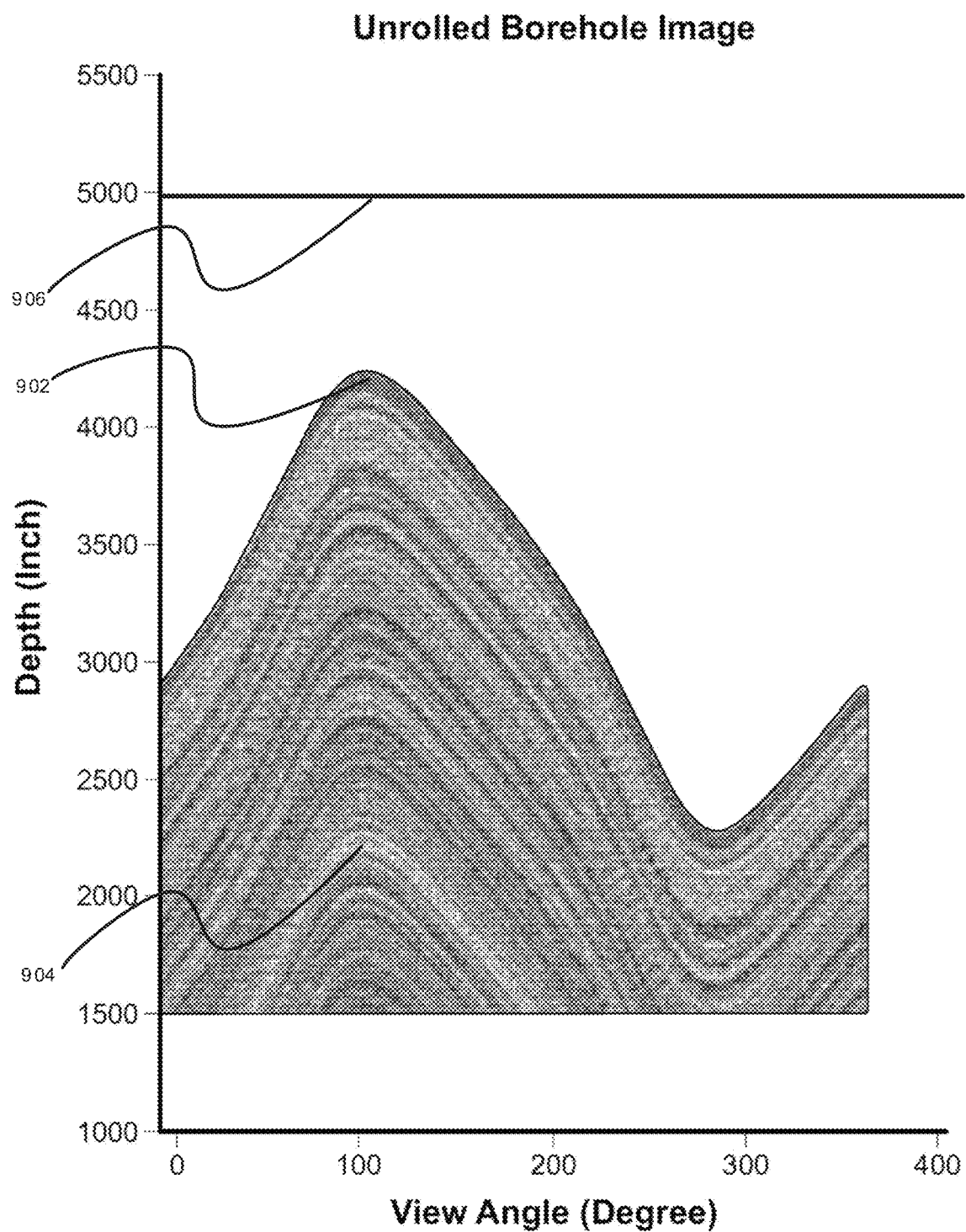
FIG. 9 depicts an unrolled borehole image corresponding to the non-circular borehole depicted in FIG. 7, according to some embodiments.

At block 312, an unrolled borehole image is generated from the reconstructed borehole wall. For example, with reference to FIGS. 1-2, a processor downhole and/or at the surface can perform this operation. FIG. 9 depicts an unrolled borehole image corresponding to the non-circular borehole depicted in FIG. 7, according to some embodiments. An unrolled borehole image 900 includes a number of lines, wherein each line is derived by unrolling an ellipse. Each ellipse can represent a subsurface formation layer of a differing resistivity. For example, with reference to the different ellipses depicted in FIG. 5, each line of the borehole image 900 can correspond to an ellipse depicted in the graph 500. The x-axis is a view angle as measured from the position 704 of the logging tool 110 and the y-axis is the borehole depth. For example, with reference to FIG. 5, the lines 902 and 904 of the unrolled borehole image 900 can be generated by plotting the ellipses 504 and 506, respectively, from 0° to 360° with their associated depths. With reference to FIG. 5, plotting non-circular shapes such as ellipses 504 and 506 will result in the lines 902 and 904 departing from the desired sinusoidal shape. Also, with reference to FIG. 5, a flat line 906 is derived from the non-slanted ellipse 502 and is added to the graph to help visualize by contrast that lines 902 and 904 traverse multiple depths. Other embodiments may include unrolled borehole image generated from the reconstructed borehole wall wherein the logging tool off-center.

Figure 10:
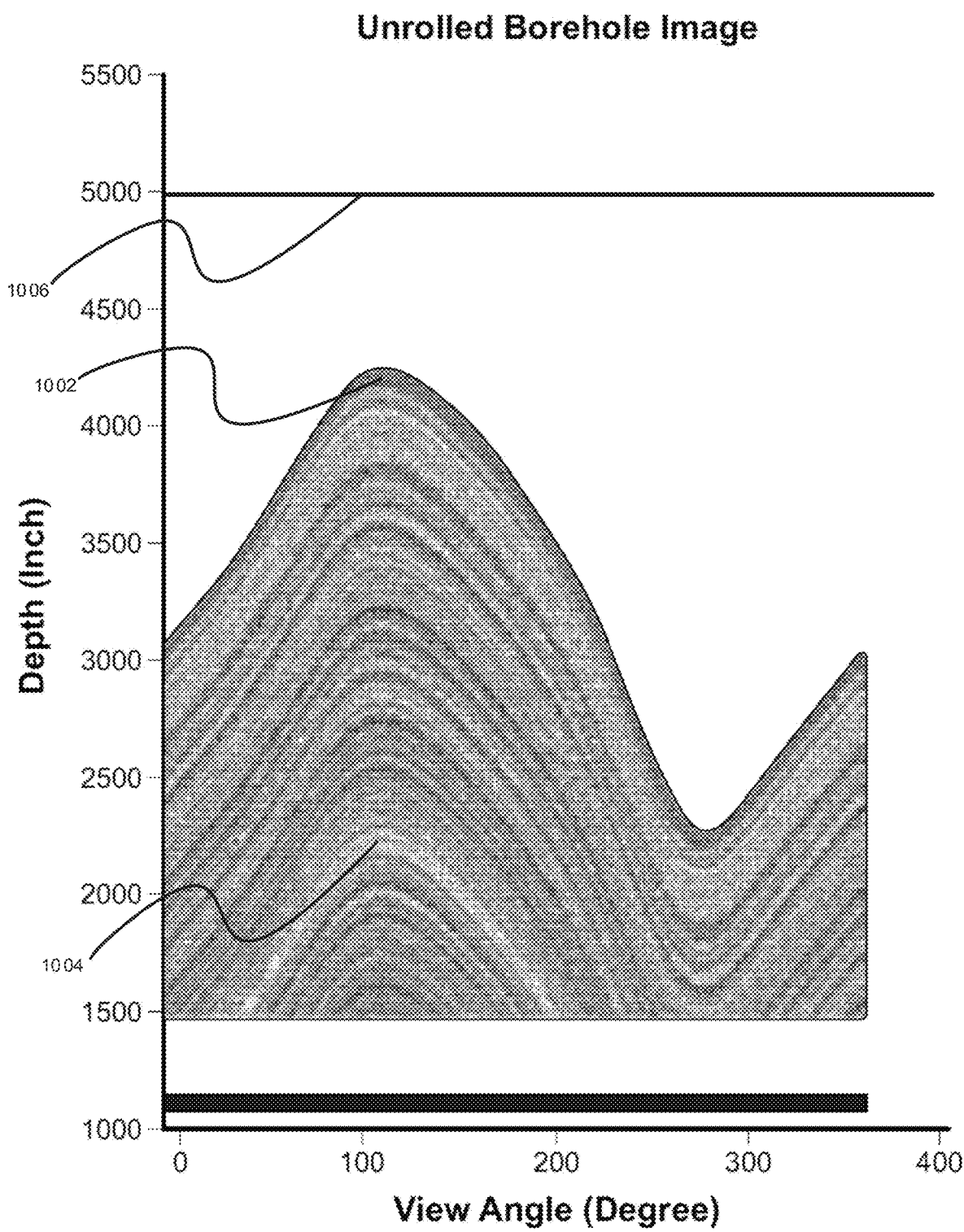
FIG. 10 depicts an unrolled borehole image corresponding to the non-circular, off-center borehole depicted in FIG. 8, according to some embodiments.

To further illustrate, FIG. 10 depicts an unrolled borehole image corresponding to the non-circular borehole with the off-center logging tool depicted in FIG. 8, according to some embodiments. An unrolled borehole image 1000 that includes a number of lines, wherein each line is derived by unrolling an ellipse. Each ellipse can represent a subsurface formation layer of a differing resistivity. For example, with reference to the different ellipses depicted in FIG. 5, each line of the borehole image 1000 can correspond to an ellipse depicted in the graph 500. The x-axis consists of the view angle as measured from the off-center position 804 of the logging tool 110 and the y-axis consists of the borehole depth. For example, with reference to FIG. 5, the lines 1002 and 1004 of the unrolled borehole image 1000 can be generated by plotting the ellipses 504 and 506, respectively, from 0° to 360° with their associated depths. With reference to FIG. 5, plotting non-circular shapes such as ellipses 504 and 506 will result in the lines 1002 and 1004 departing from the desired sinusoidal shape. Furthermore, with reference to FIG. 13, the lines 1002 and 1004 further diverge from the desired sinusoidal shape because of the off-centered nature of logging tool position 804. Also, with reference to FIG. 5, a flat line 1006 is derived from the non-slanted ellipse 502 and is added to the graph to help visualize by contrast that lines 1002 and 1004 traverse multiple depths.

At block 314 the non-circular to circular transformation matrix is determined using the constants from the ellipse equation of the reconstructed borehole image. For example, with reference to FIGS. 1-2, a processor downhole and/or at the surface can perform this operation. To illustrate, the ellipse equations from block 310 can be used to obtain the corresponding transformation matrix. With the constants $a_1 \ldots a_5$ as solved for by the series of ellipse equations at block 310, the points (x,y) from block 308 may now be transformed into points (u,v) on a unit circle through a purely linear transformation. The relationship between the measured point and the transformed point (u,v) would be governed by Equation (3).

$$\begin{bmatrix} u \\ v \end{bmatrix} = M \begin{bmatrix} x \\ y \\ 1 \end{bmatrix} \quad (3)$$

The transformation matrix M can be defined as the matrix below, where u and v are the various basis vectors that govern the linear transformation, Equation (4).

$$M = \begin{bmatrix} u_1 & u_2 & u_3 \\ v_1 & v_2 & v_3 \end{bmatrix} \quad (4)$$

The basis vectors defining the relationship between an ellipse and a circle are given by the sets of equations below, Equations (5)-(7).

$$u_1 = 1; v_1 = 0 \qquad (5)$$

$$u_2 = \frac{a_2}{2}; v_2 = \sqrt{a_2 - u_2^2} \qquad (6)$$

$$u_3 = \frac{a_3}{2}; v_3 = \frac{a_4 - 2u_2 u_3}{2v_2} \qquad (7)$$

Lastly, to transform the circle into a unit circle, the transformation matrix M has the radius defined by Equation (8), divided from its basis vectors as shown in Equation (9). This results in the final matrix multiplication to be solved, Equation (10).

$$\text{radius} = \sqrt{u_3^2 + v_3^2 - a_5} \qquad (8)$$

$$M = \frac{\begin{bmatrix} u_1 & u_2 & u_3 \\ v_1 & v_2 & v_3 \end{bmatrix}}{\text{radius}} \qquad (9)$$

$$\begin{bmatrix} u \\ v \end{bmatrix} = \frac{\begin{bmatrix} u_1 & u_2 & u_3 \\ v_1 & v_2 & v_3 \end{bmatrix}}{\text{radius}} \begin{bmatrix} x \\ y \\ 1 \end{bmatrix} \qquad (10)$$

Each ellipse would solve for its own Equations (5)-(7) by using the set of $a_1 \ldots a_5$ constants obtained at block 310. With the solutions from Equations (5)-(7), the transformation matrix, Equation (4) can be completed for each ellipses 614, 616. The ellipses 614, 616 may further be transformed into unit circles by dividing the radius of the circle, Equation (8), from its basis vectors, Equation (9). The final matrix multiplication, Equation (10) describes the transformation of reconstructed borehole wall ellipses 614, 616 into unit circles. Operations of the flowchart 300 continue at transition point A, which continues at transition point A of the flowchart 400. From the transition point A of the flowchart 400, operations continue at block 402.

Figure 11:
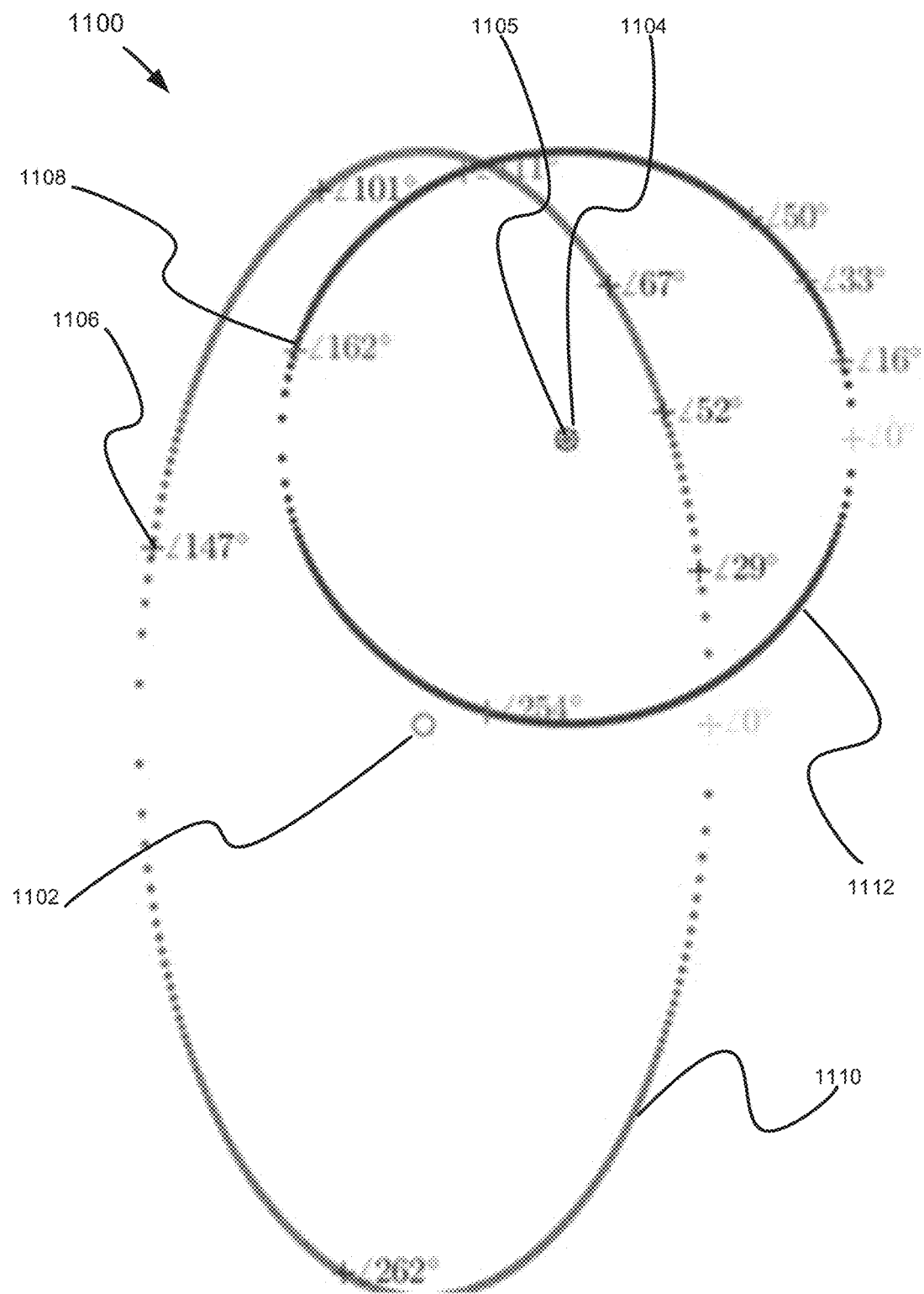
FIG. 11 depicts a graph of a borehole ellipse that is transformed to a unit circle with a new center, according to some embodiments.

At block 402 the reconstructed borehole image is transformed into a circular borehole image based on the non-circular to circular transformation matrix. For example, with reference to FIGS. 1-2, a processor downhole and/or at the surface can perform this operation. To illustrate, the ellipses 614, 616 and the corresponding caliper contact points 602, 604, 606, 608, 610, and 612 on the x-y plane are transformed into circles with points on the u-v plane. FIG. 11 depicts a graph of a borehole ellipse that is transformed to a unit circle with a new center, according to some embodiments. In particular, FIG. 11 illustrates a graph 1100 of a borehole ellipse 1110 that is transformed to a circular borehole 1112 using the operations described at block 314. Applying the final matrix multiplication described in Equation (10) to caliper contact point 1106 results in a transformed contact point 1108. This transformation would be applied to the reconstructed elliptical borehole 1110 to generate a transformed circular borehole 1112. The transformed circular borehole 1112 would be generated around the logging tool position 1105 making this position the new transformed borehole center 1104 from the borehole center 1102.

Figure 12:
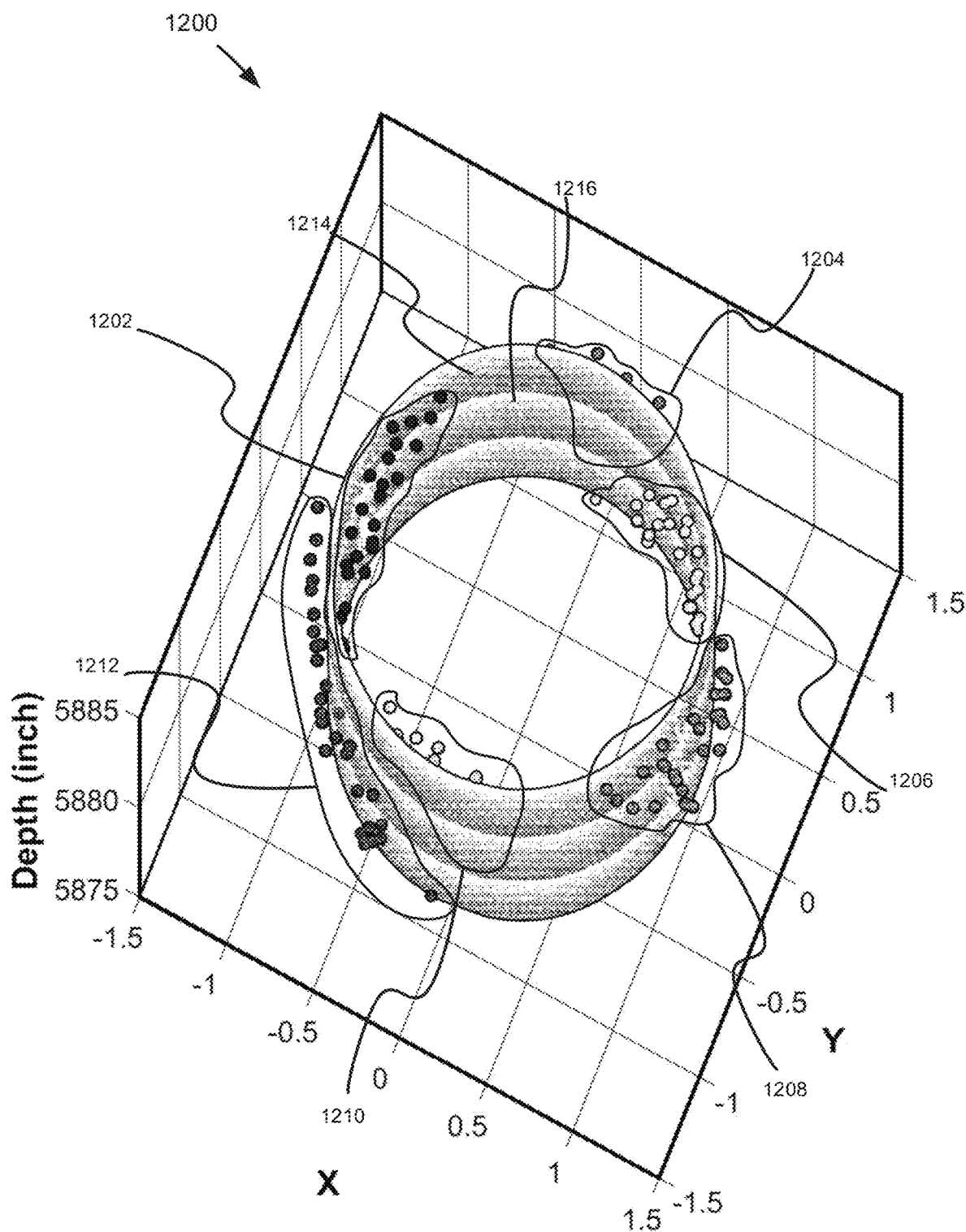
FIG. 12 depicts a graph of a reconstructed (elliptical) borehole of FIG. 6 transformed into a circular borehole, according to some embodiments.

FIG. 12 depicts a graph of a reconstructed (elliptical) borehole of FIG. 6 transformed into a circular borehole, according to some embodiments. In particular, FIG. 12 depicts a graph 1200 of a transformed circular borehole derived from FIG. 6. Applying the final matrix multiplication described in Equation (10) to the six groups of caliper contact points 602, 604, 606, 608, 610, and 612 of differing shades generates a new transformed caliper contact points 1202, 1204, 1206, 1208, 1210, and 1212 on the u-v plane. These transformed points are then used to reconstruct the borehole into circular shapes 1214, 1216 that correspond to various subsurface formation layers of different resistivities.

Figure 13:
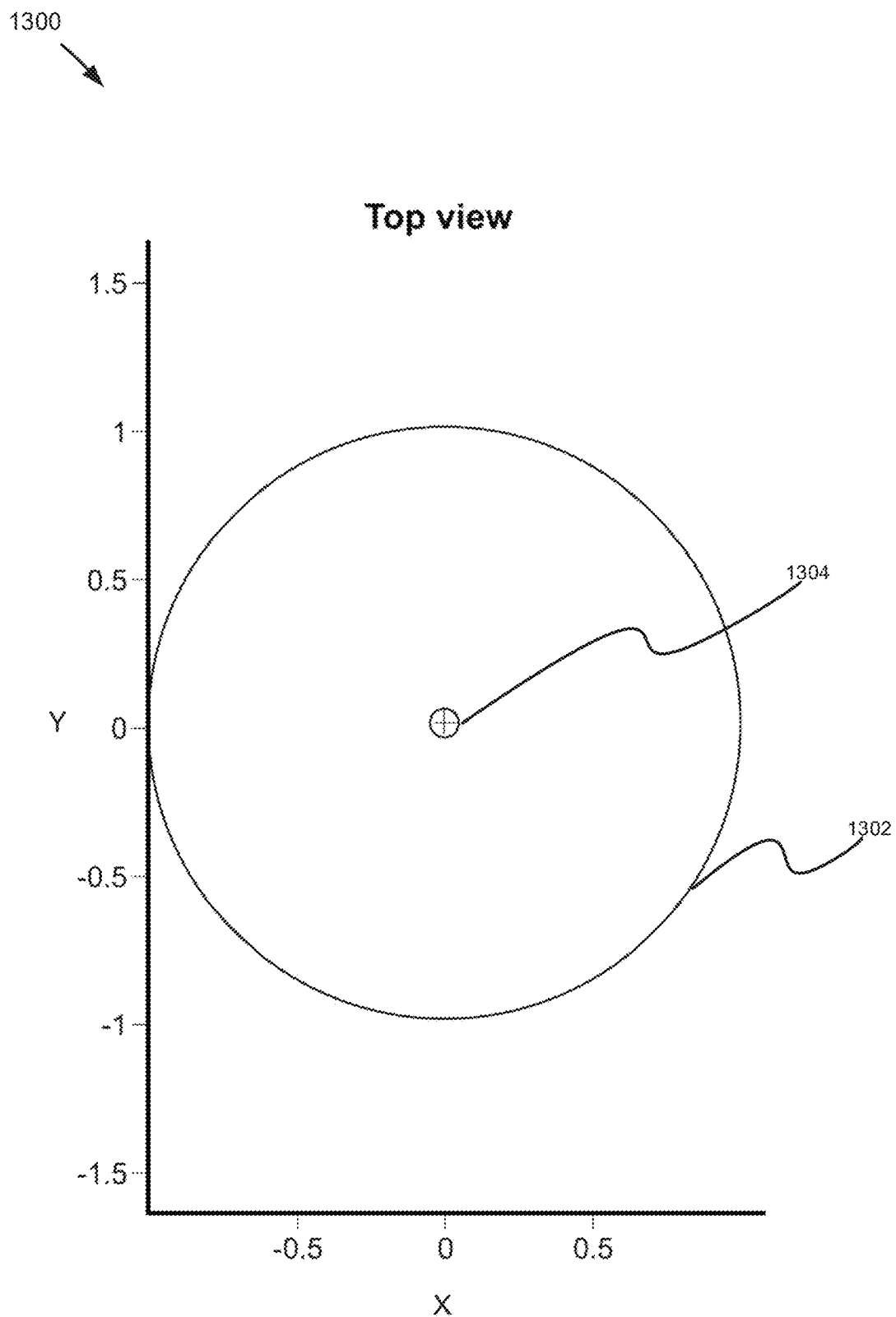
FIG. 13 depicts a top view of the borehole of FIG. 7 after being transformed into a circular borehole, according to some embodiments.
Figure 14:
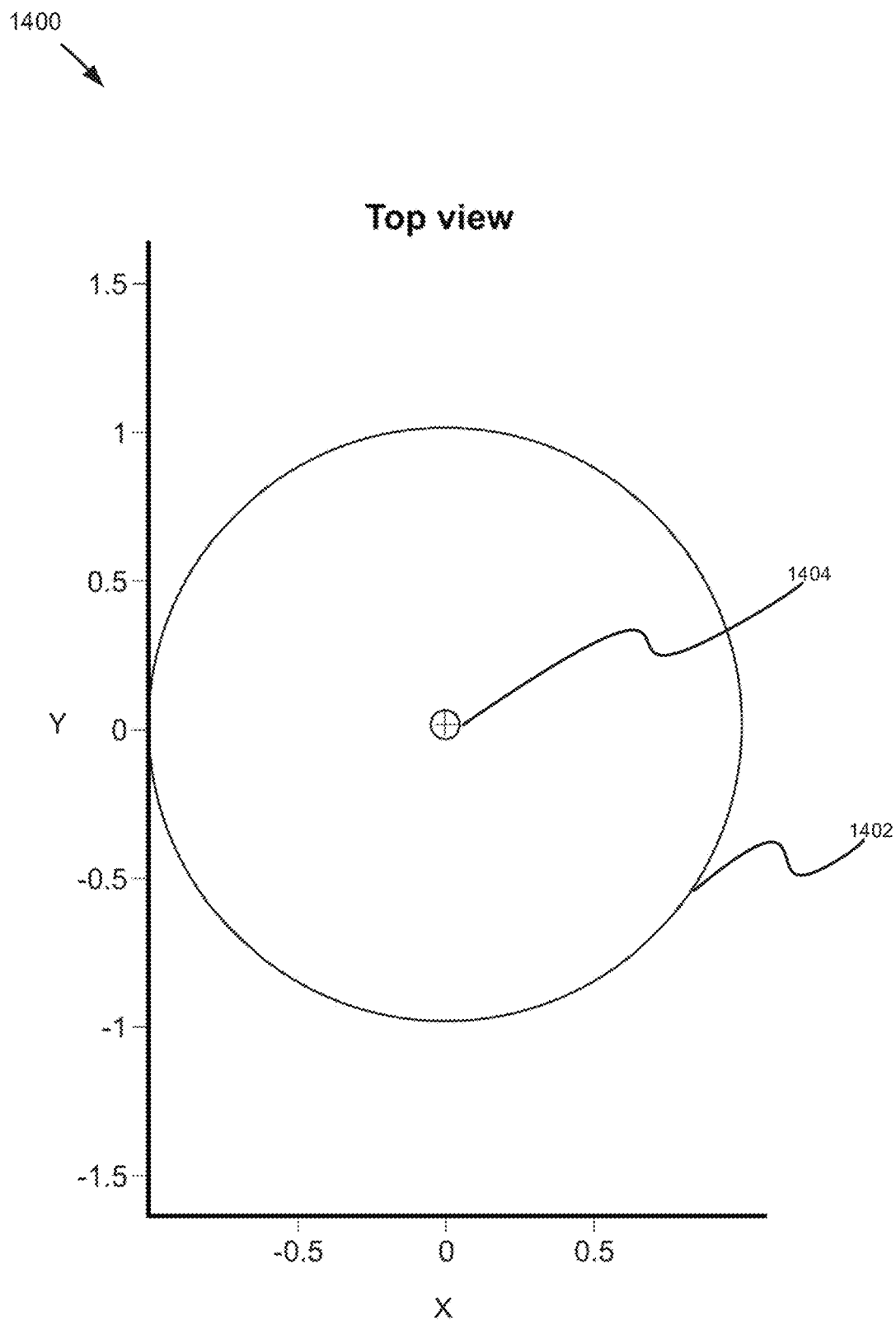
FIG. 14 depicts a top view of the borehole of FIG. 8 after being transformed into a circular borehole, according to some embodiments.

FIG. 13 depicts a top view of the borehole of FIG. 7 after being transformed into a circular borehole, according to some embodiments. In particular, FIG. 13 depicts a graph 1300 that lies in the u-v plane. For example, with reference to FIG. 7, a transformed circle 1302 is generated by applying the final matrix multiplication described in Equation (10) to the ellipse 702. The circle 1302 includes a position 1304 of the logging tool 110 that continues to remain at the same position as the center of the borehole. Other embodiments may include transformation of non-circular reconstruction of the wall of the borehole 112 where the logging tool is off-center. For example, FIG. 14 depicts a top view of the borehole of FIG. 8 after being transformed into a circular borehole, according to some embodiments. In particular, FIG. 14 depicts a graph 1400 that lies in the u-v plane. With reference to FIG. 8, a transformed circle 1402 is generated by applying the final matrix multiplication defined by Equation (10) to the ellipse 802. The circle 1402 includes a position 1404 of the logging tool 110 that is now at the center of the borehole.

Figure 15:
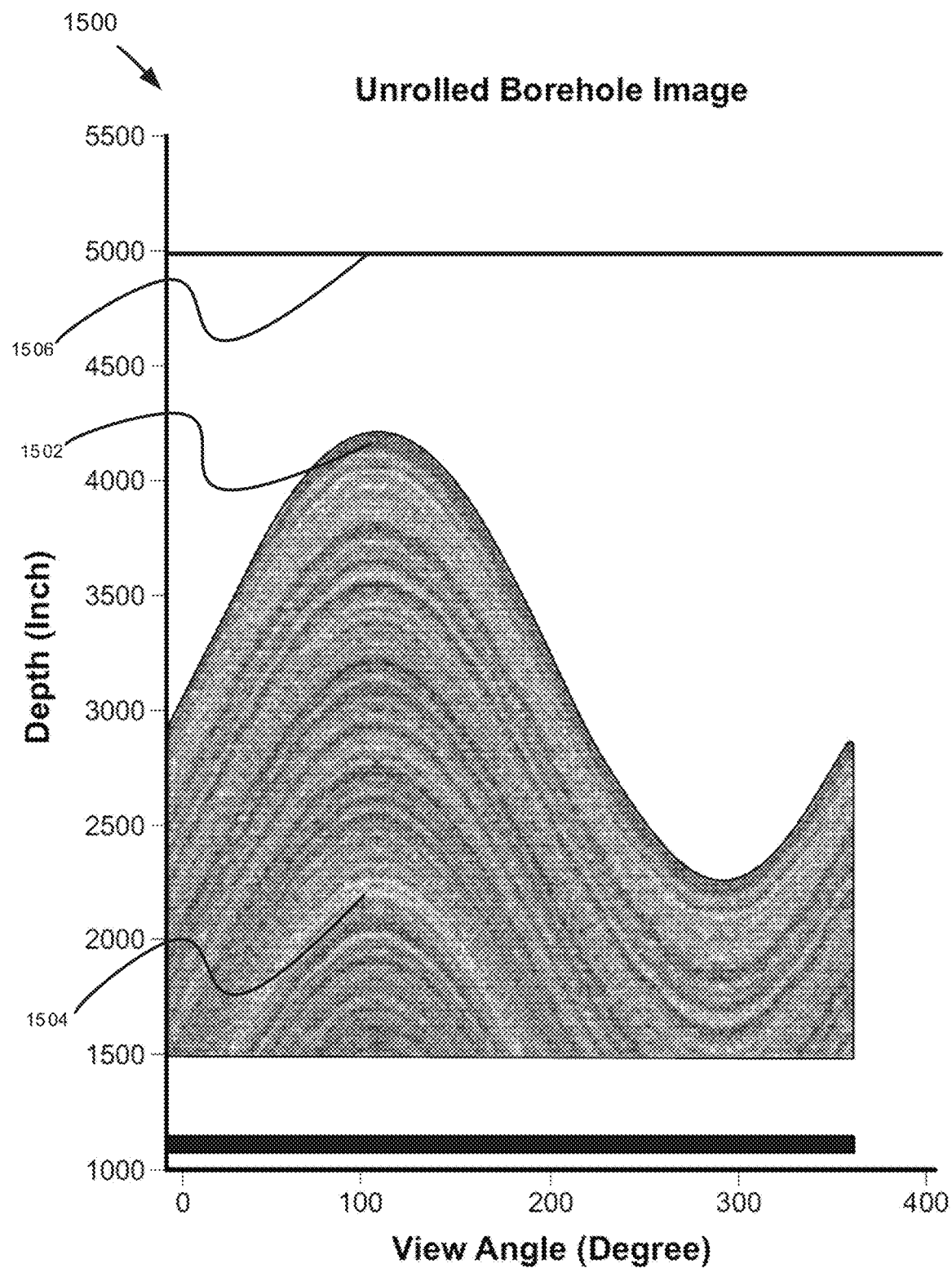
FIG. 15 depicts an unrolled borehole image corresponding to the transformed borehole depicted in FIG. 13.

At block 404, an unrolled borehole image is generated from the transformed circular borehole wall 1014, 1016. For example, with reference to FIGS. 1-2, a processor downhole and/or at the surface can perform this operation. To illustrate, FIG. 15 depicts an unrolled borehole image corresponding to the transformed circular borehole depicted in FIG. 13, according to some embodiments. An unrolled borehole image 1500 includes a number of lines, wherein each line is derived by unrolling a transformed circle. The circles can represent a subsurface formation layer of a differing resistivity associated with the corresponding ellipses from which the circles were generated. For example, with reference to FIG. 5, each line of the borehole image 1500 can correspond to a transformed circle derived from an ellipse depicted in the graph 500. The x-axis is a view angle as measured from the position 1304 of the logging tool 110 and the y-axis is the borehole depth. For example, with reference to FIG. 5, the lines 1502 and 1504 of the unrolled borehole image 1500 can be generated by plotting the transformed circles derived from ellipses 504 and 506, from 0° to 360° with their associated depths. The lines 1502 and 1504 are in sinusoidal form having been unrolled from a circular shape. Also, with reference to FIG. 5, a flat line 1506 is derived from the non-slanted ellipse 502 and is added to the graph to help visualize by contrast that lines 1502 and 1504 traverse multiple depths.

Figure 16:
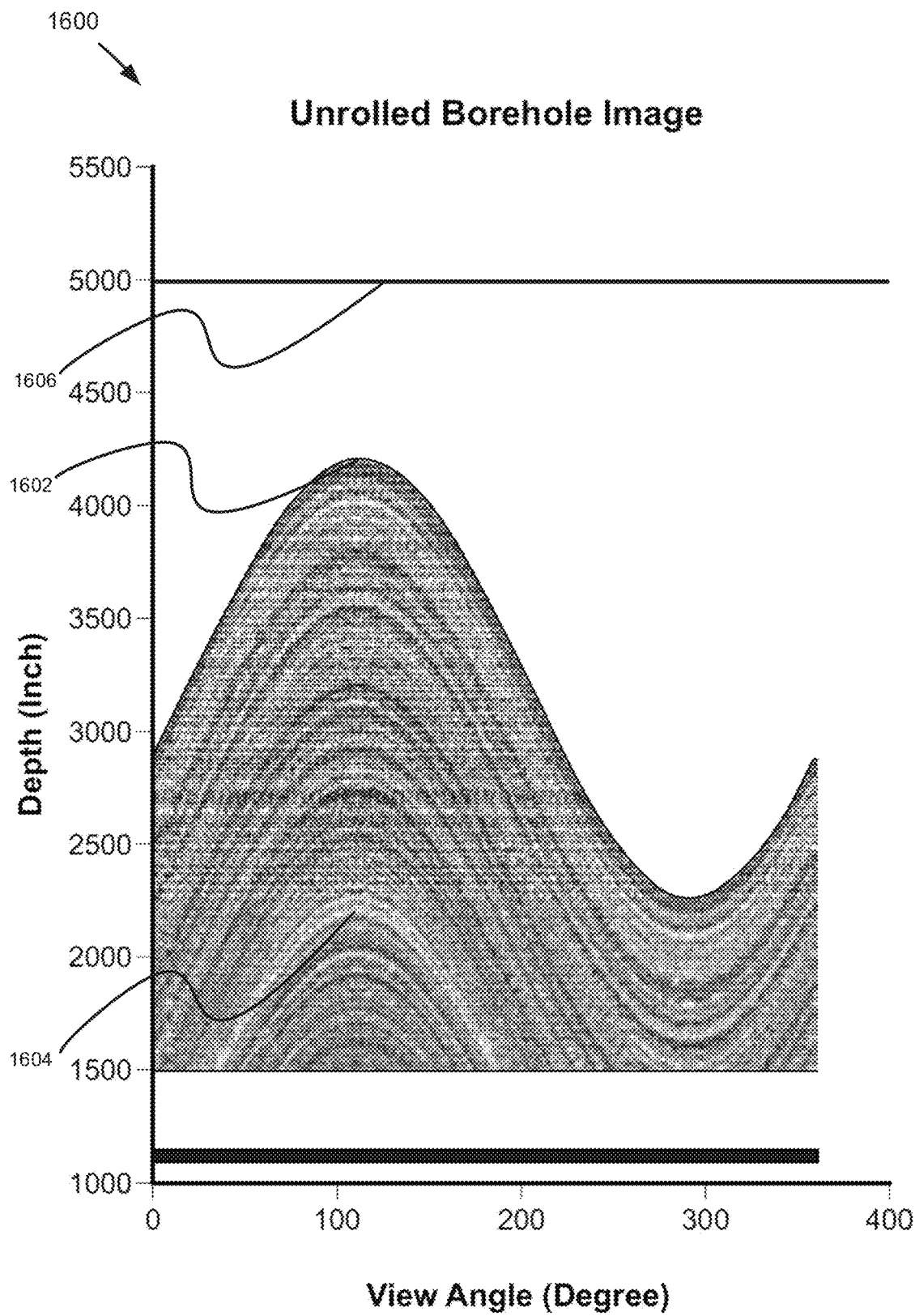
FIG. 16 depicts an unrolled borehole image corresponding to the transformed borehole depicted in FIG. 14.

Other embodiments may include unrolled borehole image corresponding to the transformed circular borehole that has corrected an off-center logging tool. FIG. 16 depicts an unrolled borehole image corresponding to the non-circular borehole depicted in FIG. 14, according to some embodiments. An unrolled borehole image 1600 includes a number of lines, wherein each line is derived by unrolling a transformed circle. The circles can represent a subsurface formation layer of a differing resistivity associated with the corresponding ellipses from which the circles were generated. For example, with reference to FIG. 5, each line of the borehole image 1600 can correspond to a transformed circle derived from an ellipse depicted in the graph 500. The x-axis is a view angle as measured from the position 1404 of the logging tool 110 and the y-axis is the borehole depth. For example, with reference to FIG. 5, the lines 1602 and 1604 of the unrolled borehole image 1600 can be generated by plotting the transformed circles derived from ellipses 504 and 506, from 0° to 360° with their associated depths. With reference to FIG. 14, the lines 1602 and 1604 are in sinusoidal form having been unrolled from a circular shape with the centralized logging tool position 1404. Also, with reference to FIG. 5, a flat line 1606 is derived from the non-slanted ellipse 502 and is added to the graph to help visualize by contrast that lines 1602 and 1604 traverse multiple depths.

At block 406, properties of the subsurface formation are evaluated based on the corrected borehole image. For example, with reference to FIGS. 1-2, a processor downhole and/or at the surface can perform this operation. Such formation evaluation can include identification of a wide range of characteristics from formation dip magnitude and direction, lamination, porosity, fluid profile, flow potential, sand attributes, and presence of permeability barriers, clasts, vugs, etc. For example, with reference to FIG. 1, the device 120 can perform this operation.

At block 408, a hydrocarbon recovery operation based on evaluation of the subsurface formation can be performed. Examples of a hydrocarbon recovery operation can include hydraulic fracturing, perforation operations, well flooding and/or additional drilling on the current borehole, drilling a new borehole, etc.

Example Computer

Figure 17:
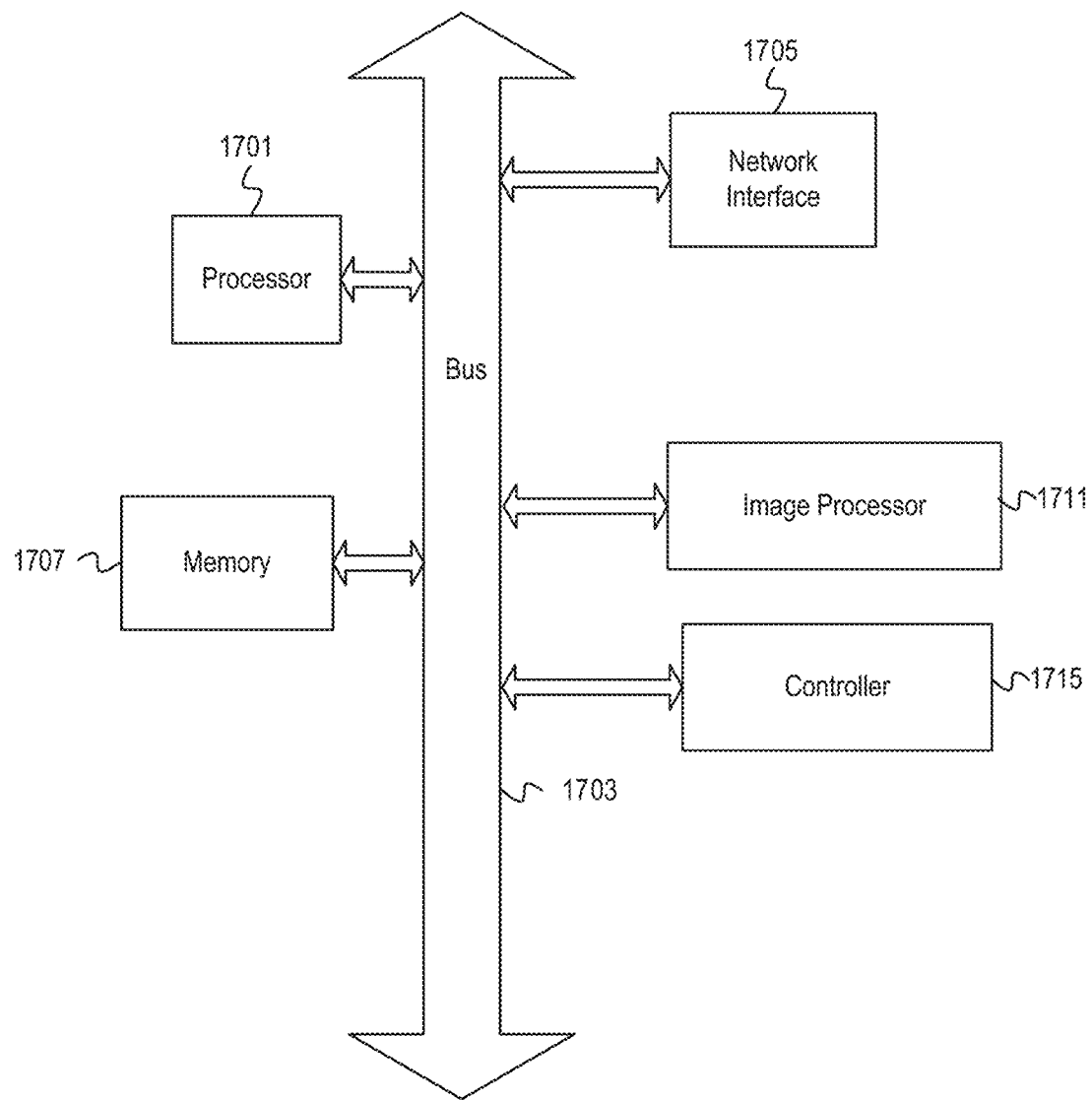
FIG. 17 depicts an example computer, according to some embodiments.

FIG. 17 depicts an example computer, according to some embodiments. The computer includes a processor 1701 (possibly including multiple processors, multiple cores, multiple nodes, and/or implementing multi-threading, etc.). The computer includes memory 1707. The memory 1707 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 1703 (e.g., PCI, ISA, PCI-Express, HyperTransport® bus, InfiniBand® bus, NuBus, etc.) and a network interface 1705 (e.g., a Fiber Channel interface, an Ethernet interface, an internet small computer system interface, SONET interface, wireless interface, etc.).

The computer also includes an image processor 1711 and a controller 1715. The image processor 1711 can perform processing of the borehole images to remove distortion (as described above). The controller 1715 can control the different operations that can occur in the response to results from processing of the borehole images. For example, the controller 1715 can communicate instructions to the appropriate equipment, devices, etc. to alter the cementing operations, drilling operations. Any one of the previously described functionalities may be partially (or entirely) implemented in hardware and/or on the processor 1701. For example, the functionality may be implemented with an application specific integrated circuit, in logic implemented in the processor 1701, in a co-processor on a peripheral device or card, etc. Further, realizations may include fewer or additional components not illustrated in FIG. 17 (e.g., video cards, audio cards, additional network interfaces, peripheral devices, etc.). The processor 1701 and the network interface 1705 are coupled to the bus 1703. Although illustrated as being coupled to the bus 1703, the memory 1707 may be coupled to the processor 1701.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine-readable medium may be a machine-readable signal medium or a machine-readable storage medium. A machine-readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine-readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine-readable storage medium may be any tangible medium that can contain, or store a program for use by or in connection with an instruction execution system, apparatus, or device. A machine-readable storage medium is not a machine-readable signal medium.

A machine-readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine-readable signal medium may be any machine-readable medium that is not a machine-readable storage medium and that can communicate, propagate, or transport a program for use by or in connection with an instruction execution system, apparatus, or device.

Program code embodied on a machine-readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine-readable medium that can direct a machine to function in a particular manner, such that the instructions stored in the machine-readable medium produce an article of manufacture including instructions which implement the function/act specified in the flowchart and/or block diagram block or blocks.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

As used herein, the term "or" is inclusive unless otherwise explicitly noted. Thus, the phrase "at least one of A, B, or C" is satisfied by any element from the set {A, B, C} or any combination thereof, including multiples of any element.

Example Embodiments

Example embodiments include the following:

Embodiment 1: A method comprising: deploying a logging tool in a borehole formed in a subsurface formation, the logging tool having a transmitter and a receiver; emitting, by the transmitter, a signal into subsurface formation; detecting, by the receiver, a response to the signal being propagated through the subsurface formation; creating, from the response, a borehole image that includes distorted features representing bedding dips in the subsurface formation; and correcting the distorted features, wherein correcting the distorted features comprises mapping points of a non-circular shape in the borehole image to points on a circular shape.

Embodiment 2: The method of Embodiment 1, wherein creating the borehole image comprises: reconstructing a wall of the borehole image into a series of non-circular shapes based on the response to create a reconstructed borehole image.

Embodiment 3: The method of Embodiments 1 or 2, wherein mapping the points comprises: determining a non-circular to circular transformation matrix using at least one constant from a non-circular equation of the reconstructed borehole image; and transforming the reconstructed borehole image into a circular borehole image based on the non-circular to circular transformation matrix.

Embodiment 4: The method of any one of Embodiments 1-3, wherein the non-circular shape comprises an elliptical shape.

Embodiment 5: The method of any one of Embodiments 1-4, wherein the distorted features comprise distorted sinusoidal features.

Embodiment 6: The method of any one of Embodiments 1-5, wherein a shape of the borehole is at least partially non-circular.

Embodiment 7: The method of any one of Embodiments 1-6, wherein deploying the logging tool comprises deploying the logging tool in an off-center position in the borehole.

Embodiment 8: The method of any one of Embodiments 1-7, further comprising performing an evaluation of the subsurface formation based on the borehole image after correcting of the distorted features.

Embodiment 9: The method of any one of Embodiments 1-8, further comprising performing a hydrocarbon recovery operation based on the evaluation of the subsurface formation.

Embodiment 10: A system comprising: a logging tool configured to be positioned in a borehole formed in a subsurface formation, wherein the logging tool comprises, a transmitter to emit a signal into the subsurface formation; a receiver to detect a response to the signal being propagated through the subsurface formation; a processor; and a machine-readable medium having instructions stored thereon that are executable by the processor to cause the processor to, create, from the response, a borehole image that includes distorted features representing bedding dips in the subsurface formation; and correct the distorted features, wherein the instructions executable by the processor to cause the processor to correct the distorted features comprises instructions executable by the processor to cause the processor to map points of a non-circular shape in the borehole image to points on a circular shape.

Embodiment 11: The system of Embodiment 10, wherein the instructions executable by the processor to cause the processor to create the borehole image comprises instructions executable by the processor to cause the processor to: reconstruct a wall of the borehole image into a series of non-circular shapes based on the response to create a reconstructed borehole image.

Embodiment 12: The system of Embodiments 10 or 11, wherein the instructions executable by the processor to cause the processor to map the points comprises instructions executable by the processor to cause the processor to: determine a non-circular to circular transformation matrix using at least one constant from a non-circular equation of the reconstructed borehole image; and transform the reconstructed borehole image into a circular borehole image based on the non-circular to circular transformation matrix.

Embodiment 13: The system of any one of Embodiments 10-12, wherein the non-circular shape comprises an elliptical shape.

Embodiment 14: The system of any one of Embodiments 10-13, wherein the distorted features comprise distorted sinusoidal features.

Embodiment 15: The system of any one of Embodiments 10-14, wherein a shape of the borehole is at least partially non-circular.

Embodiment 16: The system of any one of Embodiments 10-15, wherein the logging tool is positioned at an off-center position in the borehole during detection of the response.

Embodiment 17: The system of any one of Embodiments 10-16, wherein the instructions comprise instructions executable by the processor to cause the processor to perform an evaluation of the subsurface formation based on the borehole image after correcting of the distorted features.

Embodiment 18: One or more non-transitory machine-readable media comprising instructions executable by a processor to cause the processor to: create, from a response to a signal being propagated through a subsurface formation from a borehole in the subsurface formation, a borehole image that includes distorted features representing bedding dips in the subsurface formation; and correct the distorted features, wherein the instructions executable by the processor to cause the processor to correct the distorted features comprises instructions executable by the processor to cause the processor to map points of a non-circular shape in the borehole image to points on a circular shape.

Embodiment 19: The one or more non-transitory machine-readable media of Embodiment 18, wherein the instructions executable by the processor to cause the processor to create the borehole image comprises instructions executable by the processor to cause the processor to: reconstruct a wall of the borehole image into a series of non-circular shapes based on the response to create a reconstructed borehole image.

Embodiment 20: The one or more non-transitory machine-readable media of Embodiments 18 or 19, wherein the instructions executable by the processor to cause the processor to map the points comprises instructions executable by the processor to cause the processor to: determine a non-circular to circular transformation matrix using at least one constant from a non-circular equation of the reconstructed borehole image; and transform the reconstructed borehole image into a circular borehole image based on the non-circular to circular transformation matrix.

The invention claimed is:

1. A method comprising:
deploying a logging tool in a borehole formed in a subsurface formation, the logging tool having a transmitter and a receiver, wherein a condition that is present during logging comprises at least one of a shape of the borehole is non-circular and the logging tool is off-center within the borehole;
emitting, by the transmitter, a signal into subsurface formation;
detecting, by the receiver, a response to the signal being propagated through the subsurface formation;
creating, from the response, a borehole image that includes features in the subsurface formation; and
correcting the features, wherein correcting the features comprises mapping points of a non-circular shape in the borehole image into a plane substantially perpendicular to an axis of the borehole.

2. The method of claim 1, wherein creating the borehole image comprises:
reconstructing a wall of the borehole image into a series of non-circular shapes based on the response to create a reconstructed borehole image.

3. The method of claim 2, wherein mapping the points comprises:
determining a non-circular to circular transformation matrix using at least one constant from a non-circular equation of the reconstructed borehole image; and
transforming the reconstructed borehole image into a circular borehole image based on the non-circular to circular transformation matrix.

4. The method of claim 1, wherein the non-circular shape comprises an elliptical shape.

5. The method of claim 1, wherein the features comprise distorted sinusoidal features.

6. The method of claim 1, further comprising performing an evaluation of the subsurface formation based on the borehole image after correcting of the features.

7. The method of claim 6, wherein performing the evaluation of the subsurface formation comprises identifying characteristics of the subsurface formation from at least one of formation dip magnitude and direction, lamination, porosity, fluid profile, flow potential, sand attributes, presence of permeability barriers, clasts, and vugs.

8. The method of claim 6, further comprising performing a hydrocarbon recovery operation based on the evaluation of the subsurface formation.

9. The method of claim 1, wherein the features comprise distorted features that represent bedding dips in the subsurface formation.

10. A system comprising:
a logging tool configured to be positioned in a borehole formed in a subsurface formation, wherein a condition that is present during logging comprises at least one of a shape of the borehole is non-circular and the logging tool is off-center within the borehole, wherein the logging tool comprises,
a transmitter to emit a signal into the subsurface formation;
a receiver to detect a response to the signal being propagated through the subsurface formation;
a processor; and
a machine-readable medium having instructions stored thereon that are executable by the processor to cause the processor to,
create, from the response, a borehole image that includes features in the subsurface formation; and
correct the features, wherein the instructions executable by the processor to cause the processor to correct the features comprises instructions executable by the processor to cause the processor to map points of a non-circular shape in the borehole image into a plane substantially perpendicular to an axis of the borehole.

11. The system of claim 10, wherein the instructions executable by the processor to cause the processor to create the borehole image comprises instructions executable by the processor to cause the processor to:
reconstruct a wall of the borehole image into a series of non-circular shapes based on the response to create a reconstructed borehole image.

12. The system of claim 11, wherein the instructions executable by the processor to cause the processor to map the points comprises instructions executable by the processor to cause the processor to:
determine a non-circular to circular transformation matrix using at least one constant from a non-circular equation of the reconstructed borehole image; and
transform the reconstructed borehole image into a circular borehole image based on the non-circular to circular transformation matrix.

13. The system of claim 10, wherein the non-circular shape comprises an elliptical shape.

14. The system of claim 10, wherein the features comprise distorted sinusoidal features.

15. The system of claim 10, wherein the instructions comprise instructions executable by the processor to cause the processor to perform an evaluation of the subsurface formation based on the borehole image after correcting of the features.

16. The system of claim 15, wherein the instructions executable by the processor to cause the processor to perform an evaluation of the subsurface formation comprises instructions executable by the processor to cause the processor to identify characteristics of the subsurface formation from at least one of formation dip magnitude and direction, lamination, porosity, fluid profile, flow potential, sand attributes, presence of permeability barriers, clasts, and vugs.

17. The system of claim 10, wherein the features comprise distorted features that represent bedding dips in the subsurface formation.

18. One or more non-transitory machine-readable media comprising instructions executable by a processor to cause the processor to:
   create, from a response to a signal being propagated through a subsurface formation from a borehole in the subsurface formation, a borehole image that includes features in the subsurface formation, wherein a condition that is present during logging comprises at least one of a shape of the borehole is non-circular and a logging tool is off-center within the borehole; and
   correct the features, wherein the instructions executable by the processor to cause the processor to correct the features comprises instructions executable by the processor to cause the processor to map points of a non-circular shape in the borehole image into a plane substantially perpendicular to an axis of the borehole.

19. The one or more non-transitory machine-readable media of claim 18, wherein the instructions executable by the processor to cause the processor to create the borehole image comprises instructions executable by the processor to cause the processor to:
   reconstruct a wall of the borehole image into a series of non-circular shapes based on the response to create a reconstructed borehole image.

20. The one or more non-transitory machine-readable media of claim 19, wherein the instructions executable by the processor to cause the processor to map the points comprises instructions executable by the processor to cause the processor to:
   determine a non-circular to circular transformation matrix using at least one constant from a non-circular equation of the reconstructed borehole image; and
   transform the reconstructed borehole image into a circular borehole image based on the non-circular to circular transformation matrix.

* * * * *